(12) United States Patent
Flora

(10) Patent No.: US 12,495,832 B2
(45) Date of Patent: *Dec. 16, 2025

(54) HEAT-NOT-BURN (HNB) AEROSOL-GENERATING DEVICES WITH COMPRESSION ASSEMBLY

(71) Applicant: Altria Client Services LLC, Richmond, VA (US)

(72) Inventor: Jason Flora, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,097

(22) Filed: Jul. 18, 2024

(65) Prior Publication Data

US 2024/0365869 A1    Nov. 7, 2024

Related U.S. Application Data

(63) Continuation of application No. 18/326,282, filed on May 31, 2023, now Pat. No. 12,059,035, which is a
(Continued)

(51) Int. Cl.
*A24F 40/46*      (2020.01)
*A24F 40/53*      (2020.01)
*A24F 40/57*      (2020.01)

(52) U.S. Cl.
CPC .............. *A24F 40/46* (2020.01); *A24F 40/53* (2020.01); *A24F 40/57* (2020.01)

(58) Field of Classification Search
None
See application file for complete search history.

(56) References Cited

U.S. PATENT DOCUMENTS

| 2,104,266 A | 1/1938 | McCormick |
| 2,210,199 A | 8/1940 | Blum |

(Continued)

FOREIGN PATENT DOCUMENTS

| CN | 105307520 A | 2/2016 |
| CN | 205831075 U | 12/2016 |

(Continued)

OTHER PUBLICATIONS

Notice of Allowance dated Nov. 5, 2024 for corresponding Japanese Application No. 2023-507571.

(Continued)

*Primary Examiner* — Cynthia Szewczyk
(74) *Attorney, Agent, or Firm* — Harness, Dickey & Pierce, P.L.C.

(57) ABSTRACT

An aerosol-generating device includes a heating chamber structure, a heater coupled to the heating chamber structure, and a compression assembly. The heating chamber structure defines a fixed-volume enclosure and is configured to hold an aerosol-forming substrate within a first region of the enclosure. The heater is proximate to a first surface that at least partly defines the first region and is configured to generate heat that is transmitted into the first region to cause the aerosol-forming substrate to form an aerosol without any combustion. The compression assembly includes a compression plate and a compression actuator. The compression plate and the first surface define opposing boundaries of the first region. The compression actuator moves the compression plate through the enclosure to adjustably compress the aerosol-forming substrate in the first region against the first surface.

18 Claims, 6 Drawing Sheets

Related U.S. Application Data continuation of application No. 16/984,430, filed on Aug. 4, 2020, now Pat. No. 11,696,602.

(56) References Cited

U.S. PATENT DOCUMENTS

| | | |
|---|---|---|
| 4,044,807 A | 8/1977 | Swainson |
| 4,146,042 A | 3/1979 | Maiorana |
| 4,206,770 A | 6/1980 | Ozgener |
| 4,303,083 A | 12/1981 | Burruss, Jr. |
| 2017/0181471 A1 | 6/2017 | Phillips et al. |

FOREIGN PATENT DOCUMENTS

| | | |
|---|---|---|
| CN | 107927907 A | 4/2018 |
| EP | 3081102 A1 | 10/2016 |
| EP | 3228199 A2 | 10/2017 |
| GB | 191115437 A | 2/1912 |
| GB | 578502 A | 7/1946 |
| GB | 2534209 A | 7/2016 |
| GB | 2534213 A | 7/2016 |
| JP | 2016-178937 A | 10/2016 |
| WO | 2019/219875 A1 | 11/2019 |

OTHER PUBLICATIONS

Canadian Office Action dated Nov. 20, 2024 for corresponding Canadian Application No. 3188383.

International Search Report and Written Opinion thereof dated Oct. 11, 2021 for corresponding International Application No. PCT/US2021/037797.

International Preliminary Report on Patentability dated Feb. 7, 2023 issued for corresponding International Application No. PCT/US2021/037797.

European Communication pursuant to Article 94(3) EPC dated Oct. 23, 2024 for corresponding European Application No. 21739880.9.

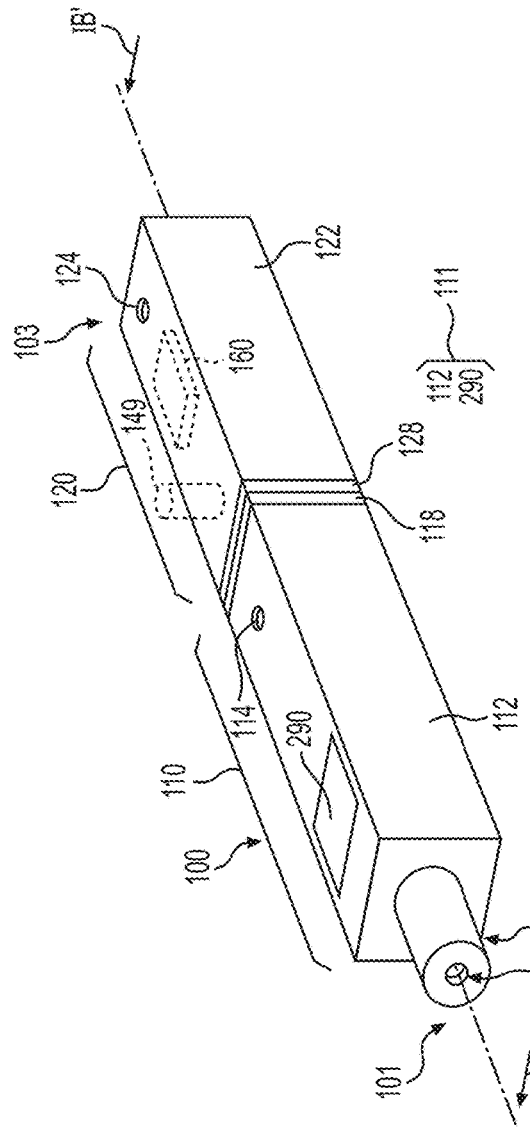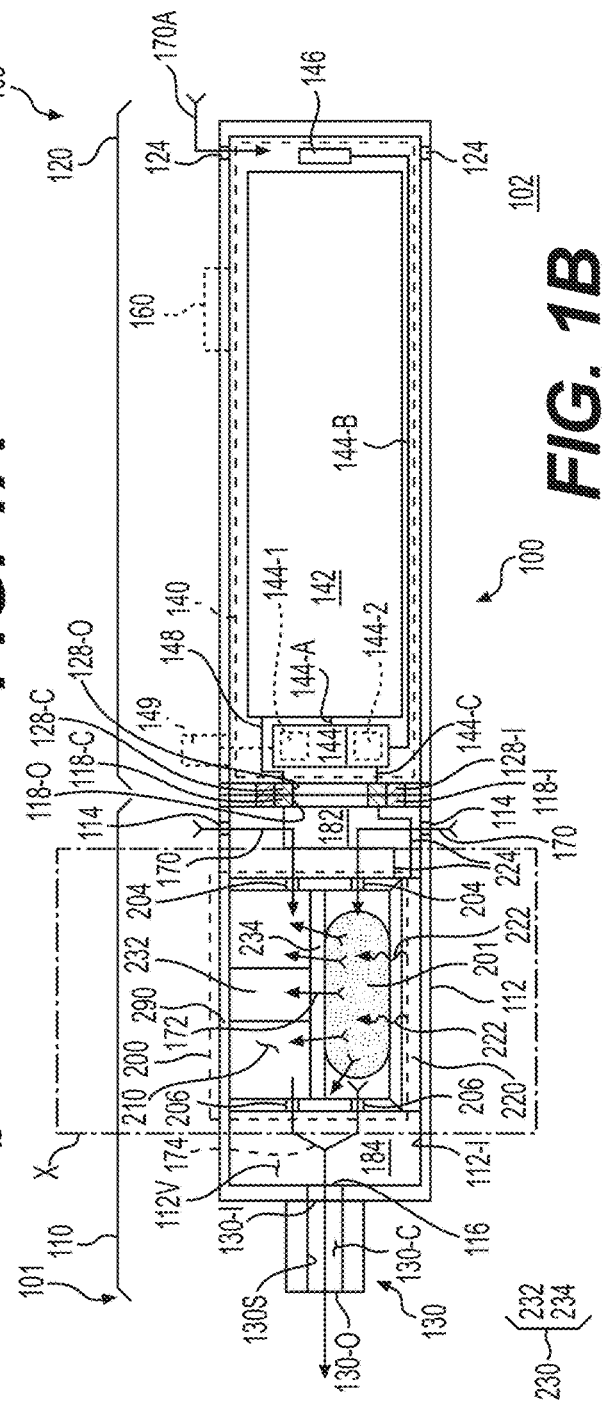

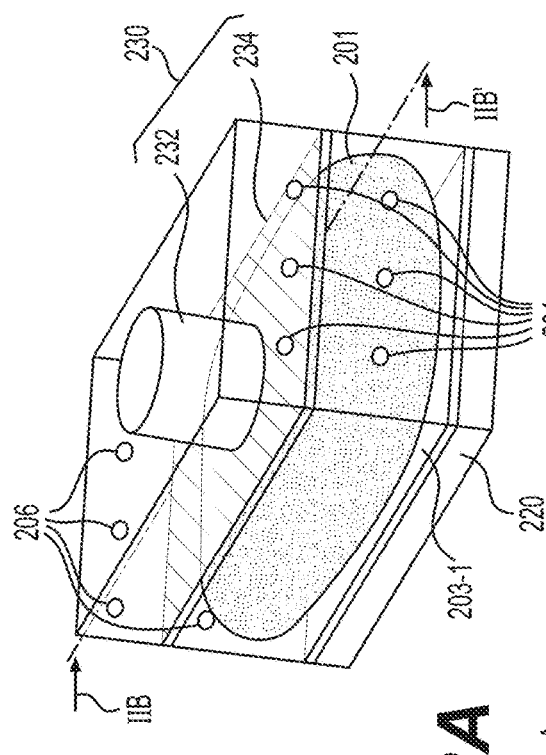
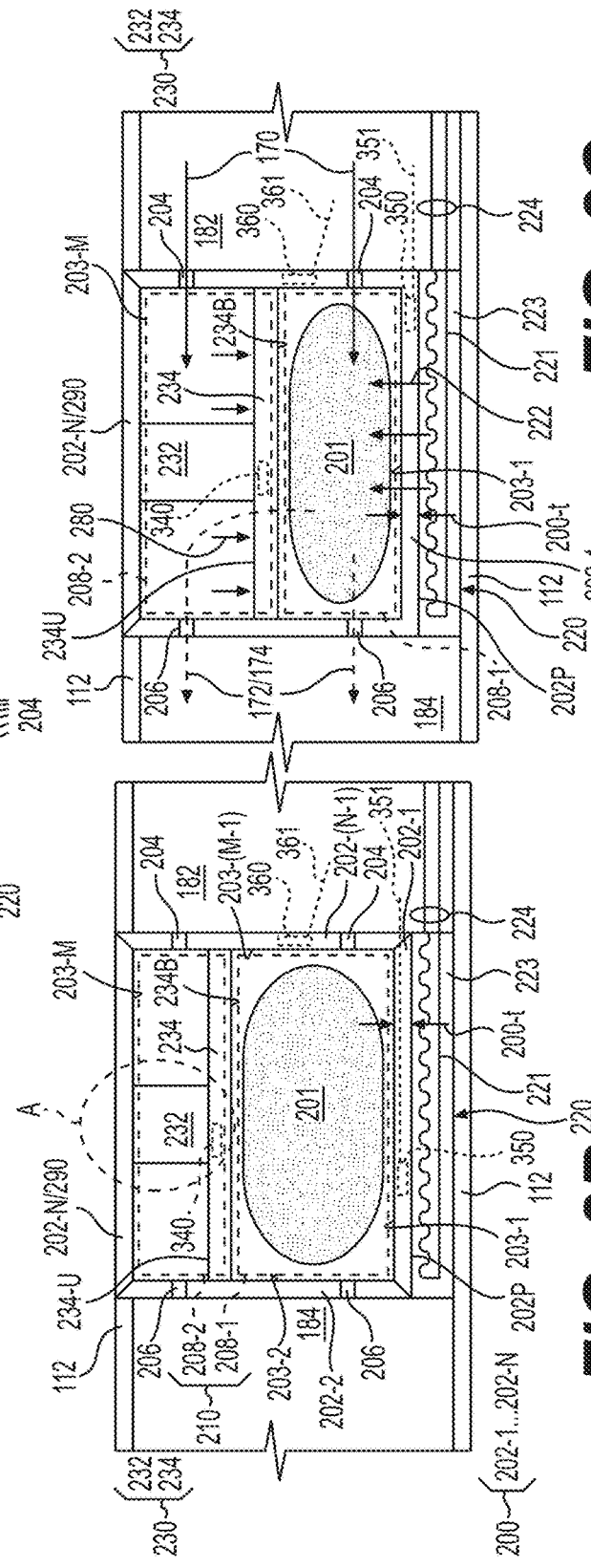
FIG. 2A
FIG. 2B
FIG. 2C

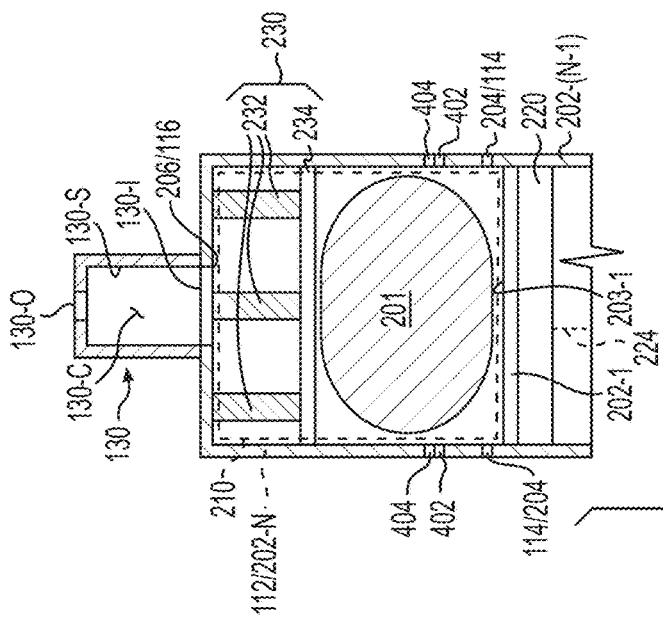
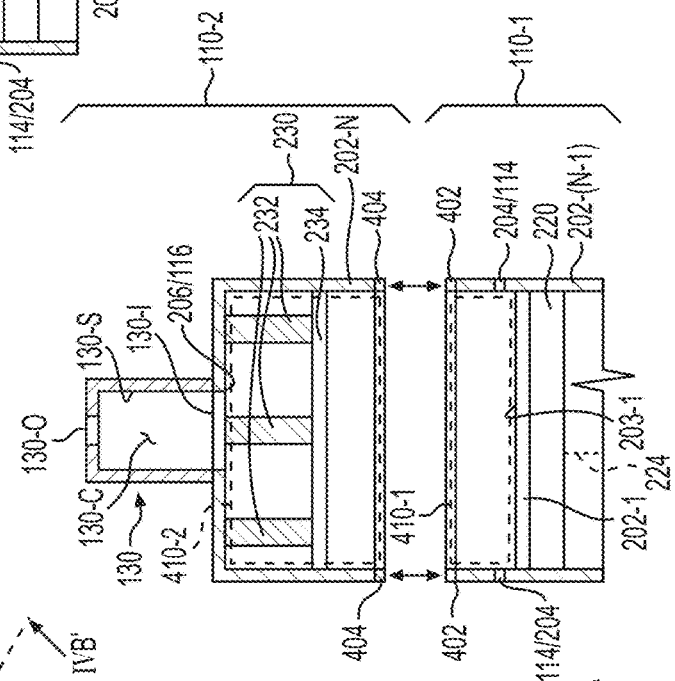
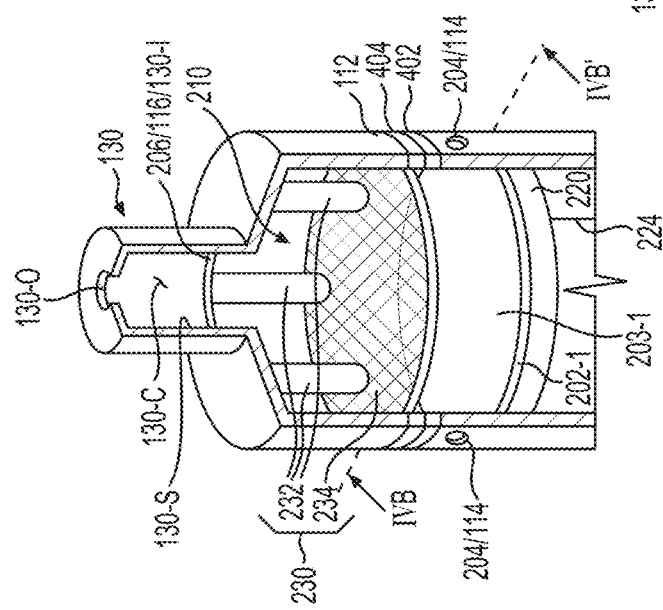
FIG. 4A
FIG. 4B
FIG. 4C

HEAT-NOT-BURN (HNB) AEROSOL-GENERATING DEVICES WITH COMPRESSION ASSEMBLY

CROSS-REFERENCE TO RELATED APPLICATIONS

This is a continuation application of U.S. application Ser. No. 18/326,282, filed May 31, 2023, which is a continuation application of U.S. application Ser. No. 16/984,430, filed Aug. 4, 2020, the entire contents of each of which are incorporated herein by reference.

BACKGROUND

Field

The present disclosure relates to heat-not-burn (HNB) aerosol-generating devices, and more particularly to non-combustive heating of aerosol-forming substrate based on adjustable compression of the aerosol-forming substrate and enabling adjustable loading of aerosol-forming substrate in the aerosol-generating devices.

Description of Related Art

Some electronic devices are configured to heat an aerosol-forming substrate to a temperature that is sufficient to release constituents of the aerosol-forming substrate while keeping the temperature below a combustion point of the aerosol-forming substrate so as to avoid any substantial pyrolysis of the aerosol-forming substrate. Such heating may be referred to herein as simply "non-combustive heating" of the aerosol-forming substrate. Such devices may be referred to as aerosol-generating devices (e.g., heat-not-burn aerosol-generating devices), and the aerosol-forming substrate heated may be a plant material, which may be tobacco or some other plant material with active ingredients. In some instances, the aerosol-forming substrate (e.g., plant material) may be introduced directly into a heating chamber of an aerosol-generating device. In other instances, the aerosol-forming substrate may be pre-packaged in individual containers to facilitate insertion and removal from an aerosol-generating device.

SUMMARY

According to some example embodiments, an aerosol-generating device may include a heating chamber structure defining an enclosure, a heater coupled to the heating chamber structure, and a compression assembly at least partially within the enclosure. The enclosure may have a fixed volume. The heating chamber structure may be configured to hold an aerosol-forming substrate within a first region of the enclosure. The heating chamber structure may include a first surface at least partially defining the first region. The heating chamber structure may further include an inlet configured to direct air into the enclosure. The heating chamber structure may further include an outlet configured to enable air to be drawn out of the enclosure. The heater may be proximate to the first surface. The heater may be configured to generate heat that is transmitted to the first surface to cause the aerosol-forming substrate to form an aerosol without any combustion of the aerosol-forming substrate. The heating chamber structure may be configured to direct the aerosol to be drawn out of the enclosure via the outlet. The compression assembly may include a compression plate and a compression actuator coupled to the compression plate. The compression plate may be configured to define a portion of the enclosure as the first region of the enclosure such that the compression plate and the first surface define opposing boundaries of the first region. The compression actuator may be configured to move the compression plate through the enclosure to adjustably compress the aerosol-forming substrate in the first region against the first surface and maintain the compression of the aerosol-forming substrate.

The compression plate may be permeable to gas flow and may enable the aerosol to pass through a thickness of the compression plate and may be configured to restrict the aerosol-forming substrate from escaping the first region of the enclosure into a remainder, second region of the enclosure.

The compression actuator may include a spring configured to exert a spring force to push the compression plate towards the first surface.

The compression actuator may include a screw actuator configured to cause linear motion of the compression plate towards the first surface based on rotation of a nut in a screw shaft.

The compression actuator may include a plunger actuator configured to be manually manipulated to induce linear motion of the compression plate towards the first surface.

At least a portion of the heating chamber structure may be at least partially detachable from a remainder of the heating chamber structure to enable direct exposure of at least a portion of the enclosure to an ambient environment that is external to the aerosol-generating device.

The portion of the heating chamber structure may be a hatch that is at least partially detachable from the remainder of the heating chamber structure.

The compression actuator may include an actuator motor that is configured to operate, based on receiving electrical power, to induce linear motion of the compression plate.

The aerosol-generating device may further include a control system configured to control the actuator motor to adjustably control compression of the aerosol-forming substrate based on adjustably controlling the linear motion of the compression plate.

The aerosol-generating device may further include a force sensor configured to generate a force sensor signal based on compression of the aerosol-forming substrate in the first region by the compression assembly. The control system may be configured to control the actuator motor to control the compression of the aerosol-forming substrate based on processing the force sensor signal.

The aerosol-generating device may further include a control system configured to control a supply of electrical power to the heater to control heating of the aerosol-forming substrate.

The control system may be configured to adjust the supply of electrical power to the heater based on determining a temperature value associated with the aerosol-forming substrate in the first region during heating by the heater, so that the determined temperature approaches a target temperature value or target range of temperature values.

The aerosol-generating device may further include an outlet assembly defining an outlet conduit extending between an inlet and an outlet that is directly exposed to an exterior of the aerosol-generating device. The outlet assembly may be configured to direct the aerosol drawn from the enclosure of the heating chamber structure to the outlet via the outlet conduit. The outlet assembly may be configured to adjustably establish a ventilation flow conduit to direct an adjustable flow of ventilation air into the outlet conduit to mix with the aerosol drawn into the outlet conduit via the inlet of the outlet assembly.

The aerosol-generating device may further include a power supply configured to supply electrical power to the heater, and a controller configured to control the supply of electrical power from the power supply to the heater.

The aerosol-generating device may further include a first section that includes the heating chamber structure, the heater, and a first section connector interface, and a second section that includes the power supply, the controller, and a second section connector interface. The first and second section connector interfaces may be complementary with each other and may be configured to detachably connect with each other to detachably connect the first and second sections together.

The aerosol-forming substrate may be a plant material.

The aerosol-forming substrate may include nicotine.

According to some example embodiments, a method for operating an aerosol-generating device may include causing a compression assembly of the aerosol-generating device to compress an aerosol-forming substrate within a first region of an enclosure of a heating chamber structure of the aerosol-generating device, such that the aerosol-forming substrate is compressed against a first surface of the enclosure. The first surface may be a surface of the enclosure that is proximate to a heater that is coupled to the heating chamber structure. The compression assembly may include a compression plate and a compression actuator coupled to the compression plate. The compression plate may be configured to define a portion of the enclosure as the first region of the enclosure such that the compression plate and the first surface define opposing boundaries of the first region. The method may include causing the heater to generate heat that is transmitted into the first region via the first surface to cause the aerosol-forming substrate to form an aerosol without any combustion of the aerosol-forming substrate.

The method may further include adjusting the compression of the aerosol-forming substrate by the compression assembly in response to processing force sensor signals received from a force sensor to determine a magnitude of the compression of the aerosol-forming substrate, and determining a difference between the determined compression and a target compression value or target range of compression values, such that the compression of the aerosol-forming substrate is caused to be changed to reduce the difference between the determined compression and the target compression value or target range of compression values.

The method may include adjusting a temperature to which the aerosol-forming substrate is heated during the heating by the heater in response to determining a temperature value associated with the aerosol-forming substrate, and determining a difference between the determined temperature value and a target temperature value or target range of temperature values, such that a supply of electrical power supplied to the heater to cause the heating is caused to be changed to reduce the difference between the determined temperature value and the target temperature value or target range of temperature values.

The method may include selectively inhibiting a supply of electrical power to the heater, to selectively inhibit heat generation by the heater, in response to a determination that a volume of the first region of the enclosure is less than a threshold value, based on determining a position of the compression plate in relation to the first surface in the enclosure and determining the volume of the first region based on the determined position of the compression plate. The aerosol-forming substrate may include nicotine.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A illustrates an aerosol-generating device, according to some example embodiments;

FIG. 1B is a cross-sectional view of the aerosol-generating device of FIG. 1A, along cross-sectional view line IB-IB', according to some example embodiments;

FIG. 2A is a perspective view of region X of the aerosol-generating device of FIG. 1B, according to some example embodiments;

FIGS. 2B-2C are cross-sectional views of region X of the aerosol-generating device of FIG. 1B, along cross-sectional view line IIB-IIB' of FIG. 2A, according to some example embodiments;

FIG. 4A is a perspective cross-sectional view of a first section of an aerosol-generating device, according to some example embodiments;

FIGS. 4B-4C are cross-sectional views of the first section of the aerosol-generating device of FIG. 4A, along cross-sectional view line IVB-IVB' of FIG. 4A, according to some example embodiments;

DETAILED DESCRIPTION OF EXAMPLE EMBODIMENTS

Figure 3B:
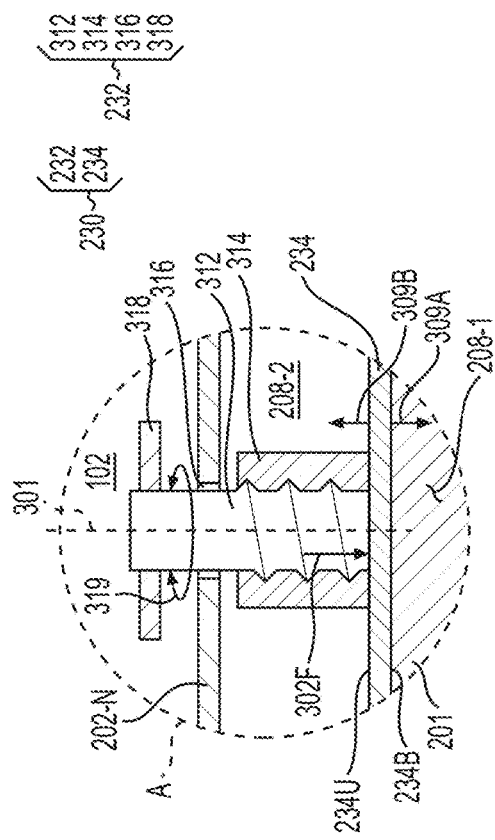
FIGS. 3A, 3B, 3C, and 3D are views of compression assemblies shown in region A of FIG. 2B, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

When the words "about" and "substantially" are used in this specification in connection with a numerical value, it is intended that the associated numerical value include a tolerance of ±10% around the stated numerical value, unless otherwise explicitly defined. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although channels and/or conduits described herein may be illustrated and/or described as being cylindrical, other channel and/or conduit cross-sectional forms are contemplated, such as square, rectangular, oval, triangular and others.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner. Such hardware may further include any known memory or non-transitory computer readable medium configured to store information, including, for example, a solid state drive (SSD).

FIG. 1A illustrates a heat-not-burn (HNB) aerosol-generating device 100, according to some example embodiments. FIG. 1B is a cross-sectional view of the aerosol-generating device 100 of FIG. 1A, along cross-sectional view line IB-IB', according to some example embodiments.

As shown in FIGS. 1A and 1B, an aerosol-generating device 100 according to some example embodiments includes a first section 110 and a second section 120. The first section 110 is at an outlet end, also referred to herein as a proximate end 101, of the aerosol-generating device 100. The second section 120 is at a tip end, also referred to herein as a distal end 103, of the aerosol-generating device 100. The first section 110 includes a first housing 112 having one or more inner surfaces 112-I that define an interior volume space 112V, a heating chamber structure 200, a heater 220, a compression assembly 230, and an outlet assembly 130, where the outlet assembly 130 is located at the proximate end 101 of the aerosol-generating device 100. The second section 120 includes a second housing 122, a power supply 142, controller 144, and a sensor 146, which may be an air-flow sensor. The power supply 142, controller 144 and the sensor 146 may collectively comprise a control system 140 of the aerosol-generating device 100. In some example embodiments, some or all of the control system 140 may be located in the first section 110 instead of the second section 120. For example, in some example embodiments, sensor 146 and/or controller 144 may be located in the first section 110 while power supply 142 is located in the second section 120. In some example embodiments, an aerosol-generating device 100 may omit the second section 120 and/or the control system 140 entirely and may be limited to the first section 110, which may be configured to couple with a separate second section 120 based on connection of complementary interfaces 118, 128 of the respective sections 110, 120. The interface 118 may be referred to herein as a first section connector interface, and the interface 128 may be referred to herein as a second section connector interface.

As shown in FIG. 1B, and as further shown in FIGS. 2A-2C, the heating chamber structure 200 may include one or more inner surfaces 203-1 to 203-M (M being any positive integer) that define an enclosure 210 having a fixed volume within an interior of the heating chamber structure 200, an aerosol-forming substrate 201 (e.g., plant material) may be located within the enclosure 210. The heater 220 coupled to the heating chamber structure 200 may generate heat 222 that is transmitted through a thickness 200t of one or more pieces of material 202-1 to 202-N (N being any positive integer that may be the same or different from M) of the heating chamber structure 200 to at least a proximate surface 203-1 that at least partially defines a region of the enclosure 210 in which the aerosol-forming substrate 201 is located (e.g., the first region 208-1). The heat 222 that is transmitted to at least the proximate surface 203-1 may heat (e.g., raise the temperature of) the aerosol-forming substrate 201, to cause the aerosol-forming substrate 201 to generate (e.g., form) an aerosol 172 without any combustion of the aerosol-forming substrate 201 (e.g., without any pyrolysis of the aerosol-forming substrate). The aerosol 172 may be mixed with (e.g., entrained in) a flow of air 170 that is drawn into the enclosure 210 to form a mixture of the aerosol 172 and the drawn air 170. Such a mixture is referred to herein as simply an aerosol 174. The air 170 may be drawn into the aerosol-generating device 100 from an external, ambient environment 102 and further drawn into the enclosure 210. The aerosol 174 may be drawn out of the enclosure 210 and further drawn out of the aerosol-generating device 100.

Still referring to FIG. 1B and FIGS. 2A-2C, the compression assembly 230 may adjustably compress the aerosol-forming substrate 201 in the first region 208-1 of the enclosure 210 towards and/or against a particular surface of the heating chamber structure 200 that is proximate to the heater 220 and is thus heated by the heater 220 based on the heat 222 generated by the heater 220 and transmitted through a thickness 200t of the heating chamber structure 200 (e.g., first surface 203-1 as shown in FIGS. 1B-2C, also referred to herein as a "hot" surface of the heating chamber structure 200). The compression assembly 230 may maintain such compression of the aerosol-forming substrate 201 before, during, and/or after the heater 220 generation of the heat 222 and/or the heated aerosol-forming substrate 201 forming the aerosol 172. Such compression of the aerosol-forming substrate 201 may result in increased packing density of the aerosol-forming substrate 201 and/or increased contact (e.g., increased contact area) between the aerosol-forming substrate 201 and the first surface 203-1. Such increased packing density and/or increased contact may enable improved efficiency of aerosol 172 generation. For example, transfer of heat 222 from the heater 220 to the aerosol-forming substrate 201 may be improved based on increased contact between the aerosol-forming substrate 201 and the first surface 203-1. In another example, distribution of heat 222 throughout the aerosol-forming substrate 201 may be improved based on improved conduction of heat through the aerosol-forming substrate 201 due to increased packing density thereof. Such compression may further enable improved uniformity and consistency of properties of different instances of aerosol 172 generated by the aerosol-generating device 100 over time (e.g., density and/or concentration of various compounds in the aerosol 172) based on enabling improved uniformity and/or consistency of the packing density of the aerosol-forming substrate 201 in the enclosure 210 before, during, and after the formation of different instances of aerosol 172 by the aerosol-forming substrate 201. Additionally, adjustable compression of aerosol-forming substrate 201 by the compression assembly 230 may be controlled to enable adjustable manual and/or automatic control over said properties of different instances of aerosol 172. Accordingly, aerosol 172 generation control may be improved through adjustable compression of the aerosol-forming substrate 201 by the compression assembly 230.

Referring back to FIGS. 1A-1B, the first and second sections 110, 120 may be coupled together at complementary interfaces 118, 128 of the respective sections 110, 120. One or both of the first section 110 and the second section 120 may be reusable. For example, the second section 120 may be reusable and the first section 110 may be non-reusable. It should be appreciated that an interface 118, 128 may be any type of connector, including, without limitation, a snug-fit, detent, clamp, bayonet, sliding fit, sleeve fit, alignment fit, threaded connector, magnetic, clasp, or any other type of connection, and/or combinations thereof. In some example embodiments, the interfaces 118, 128 are threaded connectors. In some example embodiments, the complementary interfaces 118, 128 may include conductive elements 118-C, 128-C that may serve as electrodes and/or electrical contacts to establish an electrical connection between elements of the first and second section 110, 120 based on the interfaces 118, 128 being connected to each other. The conductive element(s) of each interface may be electrically insulated from remainder portions of the interface by respective insulating elements 118-I, 128-I.

As shown, the first section 110 includes an air inlet 114 that extends through a thickness of the first housing 112 into at least a portion of the interior volume space 112V defined by the one or more inner surfaces 112-I (e.g., interior space 182 that is defined by at least one or more inner surfaces 112-I, interface 118, and heating chamber structure 200). The first section 110 further includes an outlet 116 that extends through the thickness of the first housing 112 into a separate portion of the interior volume space 112V (e.g., interior space 184 that is defined by at least one or more inner surfaces 112-I, heating chamber structure 200, and is isolated from direct fluid communication with interior space 182 independently of fluid communication through the heating chamber structure 200). As further shown, the outlet assembly 130 may be connected to the first housing 112, for example fixed to the first housing 112 or detachably connected to the first housing 112 so as to be configured to be detached therefrom. The outlet assembly 130 includes one or more inner surfaces 130-S that define an outlet conduit 130-C extending between an inlet 130-I and an outlet 130-O. As shown in FIGS. 1A-1B, the outlet assembly 130 may be coupled to the first housing 112 an outlet 116 such that the inlet 130-I is adjacent to (e.g., in direct fluid communication with) the outlet 116.

In some example embodiments, air 170 may be drawn into and through some or all of the aerosol-generating device 100, from the ambient environment 102, so that an aerosol 172 generated by the aerosol-generating device 100 may be entrained in the drawn air 170 to form an aerosol 174 that may be drawn out of the aerosol-generating device 100, based on a negative pressure being applied to an outlet of the aerosol-generating device 100. As shown in FIGS. 1A-1B, where outlet assembly 130 is coupled to the first housing 112 at an outlet 116, the outlet 130-O is the outlet of the aerosol-generating device 100. A negative pressure may be applied to the outlet 130-O to cause air 170 to be drawn into, and through, the aerosol-generating device 100. Based on said negative pressure being applied to an outlet of the aerosol-generating device 100 (e.g., outlet 130-O), air 170 may be drawn into at least the first section 110 via an air inlet 114. For example, air 170 may be drawn into interior space 182 that is directly exposed to the air inlet 114. As shown in FIGS. 1B-2C, the heating chamber structure 200 further includes an inlet 204 configured to direct air 170 into the enclosure 210. The air 170 drawn into the aerosol-generating device 100 via an air inlet 114 may be further drawn into the enclosure 210 of the heating chamber structure 200 via the inlet 204. The air 170 drawn into the enclosure 210 may mix with (e.g., entrain) aerosol 172 generated in the enclosure 210 by heated aerosol-forming substrate 201 to form aerosol 174. As shown in FIGS. 1B-2C, the heating chamber structure 200 further includes an outlet 206 configured to enable air to be drawn out of the enclosure 210. The aerosol 174 may be drawn out of the enclosure 210 via the outlet 206 (e.g., into interior space 184). The aerosol 174 may be further drawn through an outlet 116 to be drawn out of the aerosol-generating device 100 via the outlet of the aerosol-generating device 100 at which the negative pressure is applied. In example embodiments where the outlet assembly 130 is coupled to the first housing 112 such that outlet 130-O is the outlet of the aerosol-generating device 100, for example as shown in FIGS. 1A-1B, the aerosol 174 may be further drawn through the outlet conduit 130-C to be drawn out of the aerosol-generating device 100 via outlet 130-O.

As described herein, an element or space that is "directly exposed" to another space or element is exposed thereto such that there are no interposing structures therebetween. For example, when at least a portion of the enclosure 210 is directly exposed to ambient environment 102 based on hatch 290 being at least partially detached from a remainder of the heating chamber structure 200, it will be understood that the enclosure 210 is exposed to the ambient environment 102 without any intervening structures between the enclosure 210 and the ambient environment 102.

As further shown, the interfaces 118, 128 may include openings 118-O, 128-O that enable air to be drawn into at least the second section 120 via an air inlet 124, for example based on a negative pressure being applied to an outlet of the aerosol-generating device 100 (e.g., outlet 130-O).

Still referring to FIGS. 1A-1B, the heating chamber structure 200 may include one or more pieces of material 202-1 to 202-N (N being any positive integer) that are coupled together and/or are part of one or more uniform pieces of material. As a result, one or more inner surfaces 203-1 to 203-M (M being any positive integer and may be different from N) of the one or more pieces of material 202-1 to 202-N may collectively define the enclosure 210 within the heating chamber structure 200. As shown in FIGS. 1A-1B, the heating chamber structure 200 may include one or more pieces of material that are directly exposed to the exterior of the aerosol-generating device 100 (where said exterior is referred to herein as simply the ambient environment 102). For example, as shown in FIGS. 1A-1B, at least one piece of material 202-N of the heating chamber structure 200 may include a hatch 290 that is at least partially detachable from a remainder of the heating chamber structure 200 to at least partially or entirely directly expose the enclosure 210 therein to the ambient environment 102. The hatch 290 and the first housing 112 may collectively define an outer housing 111 of the first section 110. In some example embodiments, hatch 290 may be omitted from the heating chamber structure 200, such that the heating chamber structure 200 may be configured to not enable (e.g., exclude, mitigate, prevent, etc.) direct exposure of the enclosure 210 to the ambient environment 102 based on detaching any portion of the aerosol-generating device 100 from any other portion of the aerosol-generating device 100.

Referring back to FIG. 1B, the aerosol-generating device 100 may include a control system 140 that includes a controller 144 (also referred to herein as control circuitry) that is operationally connected (e.g., electrically coupled via one or more conductive elements, including for example electrical lead 144-A) to a power supply 142. The controller 144 is operationally connected (e.g., electrically coupled via one or more conductive elements, including for example electrical lead 144-B) to a sensor 146 responsive to air drawn into the aerosol-generating device 100 via an air inlet 124 and/or air inlet 114. Some or all of the control system 140 may be located in the first section 110 or the second section 120. As shown, the control system 140 may be configured to be electrically coupled to the heater 220 via one or more sets of conductive elements, including some or all of electrical leads 144-C, 148, conductive elements 118-C, 128-C of the interfaces 118, 128, or electrical leads 224. It will be understood that in some example embodiments at least some of such conductive elements may be absent from the aerosol-generating device 100. In the example embodiments shown in FIG. 1B, the control system 140 may be configured to establish an electrical circuit (e.g., based on interfaces 118, 128 connecting to each other) extending from the power supply 142 to the heater 220 via lead 144-A, controller 144, electrical lead 144-C, conductive elements 118-C and 128-C, and electrical lead 224, and further extending back to the power supply 142 via a separate electrical lead 224, a separate set of conductive elements 118-C and 128-C, and electrical lead 148. The controller 144 may be configured to operate as a switching device to selectively enable, disable, and/or adjust the supply of electrical power (e.g., electrical current) from the power supply 142 to the heater 220 via the established electrical circuit. In some example embodiments the electrical leads 144-C, 148 may directly connect the control system 140 to the heater 220 without the electrical leads 224 and without the conductive elements 118-C, 128-C of the complementary interfaces 118, 128, for example in example embodiments where the first and second sections 110, 120 are part of a single, uniform piece and are not detachable from each other.

In some example embodiments, the controller 144 may be understood to be control circuitry hardware that is implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

In some example embodiments, some or all of any of the aerosol-generating device 100 according to any of the example embodiments, including some or all of controller 144, may include, may be included in, and/or may be implemented by one or more instances (e.g., articles, pieces, units, etc.) of processing circuitry such as hardware including logic circuits; a hardware/software combination such as a processor executing software; or a combination thereof.

For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device, or memory (e.g., memory 144-1), for example a solid state drive (SSD), storing a program of instructions, and a processor (e.g., processor 144-2) that is communicatively coupled to the non-transitory computer readable storage device (e.g., via a bus connection) and configured to execute the program of instructions to implement the functionality of some or all of any of the systems according to any of the example embodiments. It will be understood that, as described herein, an element (e.g., processing circuitry, digital circuits, etc.) that is described as "implementing" an element (e.g., aerosol-generating device 100, controller 144, etc.) will be understood to implement the functionality of said implemented element (e.g., the functionality of aerosol-generating device 100, the functionality of controller 144, etc.).

The power supply 142 may include a rechargeable battery. The power supply 142 may be a Lithium-ion battery or one of its variants, for example a Lithium-ion polymer battery. The power supply 142 may be a nickel-metal hydride battery, a nickel cadmium battery, a lithium-manganese battery, a lithium-cobalt battery, a fuel cell, or a solar cell. Any other power sources or battery technology may be used. The aerosol-generating device 100 may be usable until the energy in the power supply 142 is depleted or in the case of lithium polymer battery, a minimum voltage cut-off level is achieved. Further, the power supply 142 may be rechargeable and may include circuitry configured to allow the battery to be chargeable by an external charging device. To recharge the aerosol-generating device 100, a Universal Serial Bus (USB) charger or other suitable charger assembly may be used.

The sensor 146 may be one or more of a pressure sensor, a microelectromechanical system (MEMS) sensor, etc. In some example embodiments, the sensor 146 is operationally constructed to measure a draw of air flow through the aerosol-generating device 100 (e.g., from air inlet 124 toward outlet 130-O).

In some example embodiments, the controller 144 may control the supply of electrical power from the power supply 142 to the heater 220 responsive to the sensor 146. The controller 144 may receive an input signal, or signals, from the sensor 146, and the controller 144 may control operations of the aerosol-generating device 100, including supplying an electrical current from the power supply 142 to the heater 220 to heat the aerosol-generating substrate 201 based at least in part on the signal(s) from the sensor 146.

In some example embodiments, an air flow through the aerosol-generating device 100 (e.g., air 170 drawn into the aerosol-generating device 100 via an air inlet 114 and/or air 170A drawn into the aerosol-generating device 100 via an air inlet 124) activates the aerosol-generating device 100 (e.g., causes the controller 144 to selectively electrically connect the power supply 142 to the heater 220 to cause an electrical current to flow through the heating element 221 of the heater 220). The air flow of air 170A through an air inlet 124 and the air flow of air 170 through an air inlet 114 may be induced by the same driving force, for example a negative pressure applied at the outlet 130-O. Sensor 146 may be proximate to an air inlet 124 and/or an air inlet 114 and may be configured to generate an output signal indicative of an air flow, a magnitude of an air flow, and/or a direction of an air flow, based on the flow of air 170 and/or 170A. The controller 144 may receive the output signal from the sensor 146 (e.g., via electrical lead 144-B) and determine if the following internal conditions exist: (1) a direction of the air flow indicates a draw of air flow through the aerosol-generating device 100 (versus blowing air through the aerosol-generating device 100), and/or (2) a magnitude of the air flow exceeds a threshold value. In some example embodiments, only one condition may be sufficient to activate the heater 220, while in other examples, two conditions or all conditions may have to be met before activating the heater 220. If these internal conditions are determined by controller 144 to be met, based on processing one or more signals received from sensor 146 (e.g., via electrical lead 144-B), the controller 144 may selectively electrically connect the power supply 142 to the heater 220, e.g., operating a switch included therein to close the aforementioned electrical circuit that includes the power supply 142 and the heater 220, thereby activating the heater 220. In some example embodiments, the sensor 146 generates a variable output signal that is in at least partial correlation with a magnitude of a pressure drop sensed by the sensor 146. In some example embodiments, the controller 144 may cause a variable electrical current to be sent to the heater 220 based on the variable output signal from the sensor 146.

In some example embodiments, the controller 144 is configured to activate the heater 220 independently of a response to any signal from a sensor 146 that measures air flow. For example, in some example embodiments, the control system 140 includes a manual interface 149 (e.g., a button) that extends through the second housing 122 and is electrically coupled to the controller 144 and is further configured to generate a signal that is transmitted to the controller 144 based on manual interaction with the interface 149 (e.g., based on the button being pressed). The controller 144 may receive the signal from the interface 149 and may selectively cause electrical power to be supplied from power supply 142 to the heater 220 (e.g., based on closing the electrical circuit that includes the power supply 142 and the heater 220) in response to receipt of the signal from the interface 149. In some example embodiments, the control system 140 may omit sensor 146 and include interface 149. In some example embodiments, the control system 140 may include both sensor 146 and interface 149, and the controller 144 may be configured to selectively cause electrical power to be supplied from power supply 142 to the heater 220 (e.g., based on closing the electrical circuit that includes the power supply 142 and the heater 220). The controller 144 may selectively cause electrical power to be supplied from power supply 142 to the heater 220 in response to receipt of the signal from the interface 149 and/or based on processing a signal from sensor 146 to determine that one or more of the aforementioned internal conditions exist as noted above.

In some example embodiments, the heater 220 may heat the aerosol-forming substrate 201 to a temperature of 125 degrees Celsius to 320 degrees Celsius and, in some example embodiments, between 250-280 degrees Celsius, for example based on heating the first surface 203-1 and/or heating itself (e.g., the heating element 221 and/or substrate material 223) to said temperature. However, example embodiments are not limited thereto. For example, the heater 220 may be controlled to heat the aerosol-forming substrate 201 to, and maintain the heated aerosol-forming substrate 201 at, a particular, desired temperature based on a type of aerosol-forming substrate 201 in the enclosure 210, the density (e.g., packing density) of the aerosol-forming substrate 201 in the enclosure 210, additives in the aerosol-forming substrate 201, or any combination thereof.

The controller 144 may be configured to adjustably control the temperature to which the heater 220 heats the surface 203-1, enclosure 210, and/or aerosol-forming substrate 201. For example, the controller 144 may determine a temperature of the heater 220, surface 203-1, and/or aerosol-forming substrate 201 in the enclosure 210. The controller 144 may adjustably control the supply of electrical power from the power supply 142 to the heater 220 to adjust the determined temperature based upon comparison of the determined temperature with a reference, or target, temperature or range of temperatures. Said reference temperature or range of temperatures may be associated with the material composition of the aerosol-forming substrate 201 and may be adjustable and/or programmable into the controller 144, for example via data or information input interface (not shown) of the aerosol-generating device 100.

In some example embodiments, the control system 140 includes one or more interfaces 160 configured to generate a visually-observation indication of information and/or to enable commands to be provided to the control system 140 (e.g., via manual interaction with one or more interfaces 160). Such interface(s) 160 may include one or more light-emitting diodes (LED) configured to emit light of various colors and/or patterns (e.g., intermittent blinking, continuous light emission, no light emission, etc.) to provide an indication of a state of one or more portions of the aerosol-generating device 100. Such interface(s) 160 may include a display screen that may display alphanumeric text information. Such interface(s) 160 may include one or more button interfaces. Such interface(s) 160 may be communicatively coupled to the controller 144 via one or more communication links (e.g., wired links, not shown) and the controller 144 may be configured to cause the interface(s) 160 to generate one or more particular indications to provide visually observable indication(s) of the state of one or more portions of the aerosol-generating device 100. In some example embodiments, an interface 160 may not provide any visually observable indication and may be configured to enable manual interaction with the aerosol-generating device 100 in order to provide one or more signals, commands, or the like to the controller 144. In some example embodiments, the interface(s) 160 may include interactive interfaces, including one or more buttons, interactive touchscreen displays, or the like that are configured to provide signals and/or commands to controller 144 based on manual interaction with said interface(s) 160. For example, the controller 144 may determine that additional aerosol-forming substrate 201 has been loaded into the enclosure 210 based on receiving a signal from an interface 160 based on manual interaction with the interface 160.

As discussed herein, an aerosol-forming substrate (e.g., aerosol-forming substrate 201) is a material or combination of materials that may yield an aerosol (e.g., aerosol 172). An aerosol relates to the matter generated or output by the devices disclosed, claimed, and equivalents thereof. The material may include a compound (e.g., nicotine, cannabinoid), wherein an aerosol including the compound is produced when the material is heated. The heating may be below the combustion temperature so as to produce an aerosol without involving a substantial pyrolysis of the aerosol-forming substrate or the substantial generation of combustion byproducts (if any). Thus, in an example embodiment, pyrolysis does not occur during the heating and resulting production of aerosol. In other instances, there may be some pyrolysis and combustion byproducts, but the extent may be considered relatively minor and/or merely incidental.

The aerosol-forming substrate may be a fibrous material. For instance, the fibrous material may be a botanical material. In some instances, the fibrous material may be mixed and/or combined with at least one of propylene glycol, glycerin, sub-combinations thereof, or combinations thereof. The fibrous material is configured to release a compound when heated. The compound may be a naturally occurring constituent of the fibrous material. For instance, the fibrous material may be plant material such as tobacco, and the compound released may be nicotine. Accordingly, in some example embodiments, the aerosol-forming substrate may include nicotine (e.g., the aerosol-forming substrate may include tobacco, which may include nicotine and may release the nicotine when heated). The term "tobacco" includes any tobacco plant material including tobacco leaf, tobacco plug, reconstituted tobacco, compressed tobacco, shaped tobacco, or powder tobacco, and combinations thereof from one or more species of tobacco plants, such as *Nicotiana rustica* and *Nicotiana tabacum*.

In some example embodiments, the tobacco material may include material from any member of the genus *Nicotiana*. In addition, the tobacco material may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass. Furthermore, in some instances, the tobacco material may be mixed and/or combined with at least one of propylene glycol, glycerin, sub-combinations thereof, or combinations thereof.

The compound may also be a naturally occurring constituent of a medicinal plant that has a medically-accepted therapeutic effect. For instance, the medicinal plant may be a *cannabis* plant, and the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). The fibrous material may include the leaf and/or flower material from one or more species or subspecies of *cannabis* plants such as *Cannabis sativa*, *Cannabis indica*, and *Cannabis ruderalis*. In some instances, the fibrous material is a mixture of 60-80% (e.g., 70%) *Cannabis sativa* and 20-40% (e.g., 30%) *Cannabis* indica. Accordingly, in some example embodiments, the aerosol-forming substrate may include a cannabinoid. In some instances, a compound that includes a cannabinoid may be mixed and/or combined with at least one of propylene glycol, glycerin, sub-combinations thereof, or combinations thereof.

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In some example embodiments, the aerosol-forming substrate 201 located within the enclosure 210 may include tetrahydrocannabinolic acid (THCA) and/or cannabidiolic acid (CBDA), and heat 222 generated by the heater 220 may cause decarboxylation so as to convert tetrahydrocannabinolic acid (THCA) in the aerosol-forming substrate 201 to tetrahydrocannabinol (THC), and/or to convert cannabidiolic acid (CBDA) in the aerosol-forming substrate 201 to cannabidiol (CBD).

In instances where both tetrahydrocannabinolic acid (THCA) and tetrahydrocannabinol (THC) are present in aerosol-forming substrate 201 located within the enclosure 210, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC) during the heating of the aerosol-forming substrate 201. Similarly, in instances where both cannabidiolic acid (CBDA) and cannabidiol (CBD) are present in the aerosol-forming substrate 201 located within the enclosure 210, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD) during the heating of the aerosol-forming substrate 201 located within the enclosure 210.

Furthermore, the compound may be or may additionally include a non-naturally occurring additive that is subsequently introduced into the fibrous material. In one instance, the fibrous material may include at least one of cotton, polyethylene, polyester, rayon, combinations thereof, or the like (e.g., in a form of a gauze). In another instance, the fibrous material may be a cellulose material (e.g., non-tobacco and/or non-*cannabis* material). In either instance, the compound introduced may include nicotine, cannabinoids, and/or flavorants. The flavorants may be from natural sources, such as plant extracts (e.g., tobacco extract, *cannabis* extract), and/or artificial sources. In yet another instance, when the fibrous material includes tobacco and/or *cannabis*, the compound may be or may additionally include one or more flavorants (e.g., menthol, mint, vanilla). Thus, the compound within the aerosol-forming substrate may include naturally occurring constituents and/or non-naturally occurring additives. In this regard, it should be understood that existing levels of the naturally occurring constituents of the aerosol-forming substrate may be increased through supplementation. For example, the existing levels of nicotine in a quantity of tobacco may be increased through supplementation with an extract containing nicotine. Similarly, the existing levels of one or more cannabinoids in a quantity of *cannabis* may be increased through supplementation with an extract containing such cannabinoids.

In some example embodiments, the sections 110, 120 may be part of a same, single piece without the need for the interfaces 118, 128, such that interfaces 118, 128 may be omitted in some example embodiments of the aerosol-generating device 100. In some example embodiments, where the first section 110 and the second section 120 are part of a single, same piece, the first and second housings 112, 122 may be part of a single, same uniform piece of material (e.g., a same housing) such that the aerosol-generating device 100 may include a single-piece housing that encompasses both the first and second sections, and interfaces 118, 128 may be absent from the aerosol-generating device 100.

In some example embodiments, the outlet assembly 130 may be omitted from the aerosol-generating device 100, such that the outlet 116 is the outlet of the aerosol-generating device 100. As a result, air 170 may be drawn into the aerosol-generating device 100 via an air inlet 114 and may be drawn into enclosure 210 via an inlet 204, and the aerosol 174 may be drawn out of the enclosure 210 via an outlet 206 and further drawn out of the aerosol-generating device 100 via an outlet 116, based on a negative pressure being applied to the outlet 116.

While the inlets and outlets as described herein (e.g., inlets 114, 124, 204 and outlets 206, 116, 130-O) are referred to in the singular form (e.g., an outlet 206), it will be understood that multiple instances of each inlet or outlet may be present as a set of inlets or outlets. For example, as shown in FIG. 1B, multiple air inlets 114 and multiple air inlets 124 may be present, and multiple inlets 204 and multiple outlets 206 may be present. Therefore, it will be understood that the descriptions herein relating to singular inlets or outlets (e.g., an air inlet 114) may apply equally to sets of multiple corresponding inlets or outlets (e.g., a plurality of air inlets 114).

In some example embodiments, interior space 182 may be omitted, and an inlet 204 may extend from the enclosure 210 and through a thickness of a piece of material of the heating chamber structure 200 that is also a portion of the first housing 112 to the ambient environment, such that inlet 204 is also an air inlet 114. In some example embodiments, interior space 182 may be omitted, and an outlet 206 may extend from the enclosure 210 and through a thickness of a piece of material of the heating chamber structure 200 that is also a portion of the first housing 112. As a result, the outlet 206 may be also an outlet 116 and may be an outlet of the aerosol-generating device 100, for example in example embodiments where outlet assembly 130 is omitted from the aerosol-generating device 100 so that the outlet 206/116 is directly exposed to the ambient environment 102.

FIG. 2A is a perspective view of region X of the aerosol-generating device of FIG. 1B, according to some example embodiments. FIGS. 2B-2C are cross-sectional views of region X of the aerosol-generating device of FIG. 1B, along cross-sectional view line IIB-IIB' of FIG. 2A, according to some example embodiments.

As shown in FIGS. 2A-2C, the heating chamber structure 200 includes one or more pieces of material 202-1 to 202-N (where N is any positive integer) having one or more inner surfaces 203-1 to 203-M (where M is any positive integer and may be different from N) that collectively define an enclosure 210 having a fixed internal volume within an interior of the heating chamber structure 200. Where the heating chamber structure 200 includes multiple pieces of material (e.g., N is equal to or greater than 2), the separate pieces may be coupled together via any known methods for joining separate pieces of material (e.g., adhesive, welding, etc.). The heating chamber structure 200 includes an inlet 204 that extends through a thickness 200t of at least one piece, for example piece of material 202-2 as shown in FIGS. 2A-2C, to an exterior of the heating chamber structure 200 that is distal from the proximate end 101. The heating chamber structure 200 includes an outlet 206 that extends through a thickness 200t of at least one piece, for example piece of material 202-3 as shown in FIG. 2, to an exterior of the heating chamber structure 200 that is proximate to the proximate end 101. Accordingly, when air 170 is drawn through the aerosol-generating device 100, for example in response to a negative pressure being applied to an outlet of the aerosol-generating device 100 (e.g., outlet 130-O), the inlet 204 is configured to direct air 170 into the enclosure 210. The outlet 206 may be configured to enable the air 170 and aerosol 172 generated in the enclosure 210 to be drawn out of the enclosure 210 and towards the outlet as aerosol 174.

As shown in FIGS. 2A-2C, the heater 220 may be coupled to the heating chamber structure 200 such that the heater 220 is proximate to a particular, first surface 203-1 of the heating chamber structure 200 (e.g., is closest to the first surface 203-1 in relation to any other inner surface 203-2 to 203-M of the heating chamber structure 200). The first surface 203-1 may at least partially define a first region 208-1 of the enclosure 210. As shown in FIGS. 2A-2C, the heater 220 may be directly connected to, and thus in direct contact with, an outer surface 202p of the heating chamber structure 200 that is opposite the first surface 203-1 across a thickness 200t of at least one piece of the heating chamber structure 200 (e.g., piece of material 202-1 as shown in FIGS. 2A-2C). As a result, the heater 220 may be configured to generate heat 222 that is transmitted to the first surface 203-1 via conduction through the thickness 200t of the heating chamber structure 200 between opposite surfaces 202p and 203-1. The heat 222 may thus be transmitted into the first region 208-1 of the enclosure 210 via at least the first surface 203-1. Thus, in some example embodiments, the first surface 203-1 may be referred to as a "hot surface" and a remainder of surfaces 203-2 to 203-M may be referred to as "cold surfaces" based on the heater 220 being configured to transmit heat 222 into the enclosure 210 exclusively via the first surface 203-1 and not via any of the other surfaces 203-2 to 203-M.

In some example embodiments, the heater 220 is configured to undergo Joule heating (which is also known as ohmic/resistive heating) upon the application of an electric current thereto (e.g., upon receipt of electrical power from the power supply 142). The heater 220 may be a resistive heater in some example embodiments. Stated in more detail, the heater 220 may be formed of conductors (same or different) and configured to produce heat when an electric current passes through the conductors. The electric current may be supplied from the power supply 142 within the aerosol-generating device 100. Suitable conductors for the heater 220 include an iron-based alloy (e.g., stainless steel) and/or a nickel-based alloy (e.g., nichrome). In some example embodiments, the heater 220 is planar. The resistance of the heater 220 may be 1 ohm. Furthermore, although the heater 220 is shown in FIG. 2A-2C as being planar, it should be understood that, in some example embodiments, the heater 220 may be a different shape. The electric current from the power supply 142 may be transmitted via electrical leads 224 connected to the heater 220, electrical leads 144-C, 148, and/or conductive elements 118-C, 128-C of complementary interfaces 118, 128. Furthermore, the supply of the electric current from the power supply 142 to the heater 220 may be a manual operation (e.g., button-activated via button interface 149) or an automatic operation (e.g., sensor-activated via sensor 146).

In some example embodiments, the heater 220 may include a heating element 221 that may include a wire coil. The heating element 221 may be on and/or at least partially embedded in a substrate material 223. In some example embodiments, the substrate material 223 may be absent from heater 220. The wire may be a metal wire and/or the wire coil may extend fully or partially along the length of heater 220. In some example embodiments, the wire coil may be isolated from direct contact with the surface (e.g., 202p) that the heater 220 is contacting.

While the heater 220 may include a resistive heater, for example including a heating element 221 that may include a wire coil that generates heat based on an electrical current being passed through the wire coil, it will be understood that example embodiments are not limited to such heaters 220. For example, heater 220 may be any heater that is configured to generate heat 222 that is transmitted to the heating chamber structure 200 through conduction, convection, radiation, any combination thereof, or the like. Heater 220 may omit one or both of the heating element 221 or the substrate material 223. In an example, heater 220 may be a ceramic heater. In another example, heater 220 may be configured to generate heat 222 based on combustion of a fuel (e.g., butane) with an oxidizer (e.g., air) and directing the resulting heat and/or combustion products (e.g., flame) to impinge on and/or be proximate to an outer surface of the heating chamber structure 200 (e.g., surface 202p) to cause heating of at least the first region 208-1 of the enclosure 210 and/or aerosol-forming substrate 201 located therein via at least conduction of said heat 222 through at least a portion of the heating chamber structure 200.

In some example embodiments, the substrate material 223 may be constructed from one or more of polyester, polyethylene, polyvinyl chloride, thermoset laminate, polyethylene napthalate, polyimide, silicone rubber, or some combination thereof. Heater 220 may include a substrate material 223 that includes a pressure sensitive adhesive (PSA) layer configured to bond the heater 220 to a surface, for example surface 202p. The PSA layer may be formed of one or more of acrylic materials or silicone materials. Heater 220 may have a minimum width of 6 mm. Heater 220 may have a dielectric strength of up to 1500 VAC. Heater 220 may have a watt density of up to 25 W/square inches. Heater 220 may have an operating voltage of up to about 277 VAC or 277 VDC. Heater 220 may have an overall maximum operating temperature of about 482 degrees Celsius.

The heating element 221 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 221 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 221 may include at least one material selected from the group consisting of stainless steel, copper, copper alloys, nickel-chromium alloys, super alloys and combinations thereof. In some example embodiments, the heating element 221 may be formed of nickel-chromium alloys or iron-chromium alloys. In some example embodiments, the heater 220 may be a ceramic heater that heats aerosol-forming substrate 201 through conduction. The heater 220 is configured to heat the aerosol-forming substrate 201. As a result of the heating, the temperature of the aerosol-forming substrate 201 may increase, and an aerosol 172 may be generated.

Still referring to FIGS. 2A-2C, a compression assembly 230 may be at least partially (e.g., entirely) located within the enclosure 210 of the heating chamber structure 200. The compression assembly 230 includes a compression plate 234 and a compression actuator 232 that is coupled to the compression plate 234. As shown in FIGS. 2A-2C, the compression plate 234 may have a bottom surface 234B that opposes the first surface 203-1 in the enclosure 210, such that at least the compression plate 234 and the first surface 203-1 define a portion of the enclosure 210 as the first region 208-1 of the enclosure 210. The first region 208-1 is partially defined by a first surface 203-1 that is proximate to the heater 220 and the compression plate 234 (e.g., the bottom surface 234B thereof) opposes the first surface 203-1. As shown, the first surface 203-1 and the compression plate 234 define opposing boundaries of the first region 208-1. As shown in FIGS. 2A-2C, a remainder region of the enclosure 210 that excludes the first region 208-1 is referred to as a second region 208-2. Thus, the first region 208-1 is a portion of the enclosure 210 that is proximate to the first surface 203-1 and the remainder, second region 208-2 is the remainder region of the enclosure 210 that is distal from the first surface 203-1.

Still referring to FIGS. 2A-2C, the compression actuator 232 is fixed at one end to the compression plate 234 (e.g., to the upper surface 234U) and at an opposite end to a portion of the heating chamber structure 200. As shown in FIGS. 2B-2C, the compression actuator 232 is configured to actuate to move linearly 280 the compression plate 234 through the enclosure 210, in a direction along an axis that is normal to at least a portion of the bottom surface 234B, to adjust (e.g., reduce) a volume of the first region 208-1 and thus to adjustably compress the aerosol-forming substrate 201 in the first region 208-1 against at least the first surface 203-1.

As shown in FIGS. 2A-2C, aerosol-forming substrate 201 may be located within the first region 208-1 of the enclosure 210, such that the aerosol-forming substrate 201 may be in contact with the first surface 203-1. Heater 220 may generate heat 222 that is transmitted into the first region 208-1, for example via first surface 203-1 based on conduction through the thickness 200t of the heating chamber structure 200 between opposing surfaces 202p and 203-1. Such transmitted heat 222 may heat the aerosol-forming substrate 201 that is located in the first region 208-1 to a temperature and/or temperature range that causes the aerosol-forming substrate 201 to form an aerosol 172 without any combustion of the aerosol-forming substrate 201.

As shown in FIGS. 2B-2C, the compression assembly 230 is configured to cause the compression plate 234 to move linearly 280 through the enclosure 210, based on operation of the compression actuator 232, to adjustably compress the aerosol-forming substrate 201 in the first region 208-1 against the first surface 203-1. The compression assembly 230 may maintain such compression of the aerosol-forming substrate 201 before, during, and/or after the heater 220 generation of the heat 222 and/or the heated aerosol-forming substrate 201 forming the aerosol 172. Such adjustable compression, as described herein, may be manually controllable, controlled by controller 144, and/or may be controlled without manual or electronic intervention (e.g., may be implemented via a spring force exerted by a spring).

As shown in FIG. 2B, in some example embodiments, the aerosol-forming substrate 201 may initially be a loosely-packed material, and compression of the aerosol-forming substrate 201 based on the linear movement 280 of the compression plate 234, as shown in FIG. 2C, may cause packing density of the aerosol-forming substrate 201 in first region 208-1 to be increased before, during, and/or after generation of one or more separate instances of aerosol 172. Increased packing density of the aerosol-forming substrate 201 may enable increased conductive heating throughout the aerosol-forming substrate 201 based on generation and transmission of heat 222 by the heater 220 to the aerosol-forming substrate 201 via the first surface 203-1 against which the aerosol-forming substrate 201 may be compressed by the compression plate 234. Such increased packing density of the aerosol-forming substrate 201 which may be implemented and maintained by the compression assembly 230 may result in more efficient and/or uniform heating of the aerosol-forming substrate 201 based on heat 222 generation by the heater 220, thereby resulting in more efficient and/or uniform formation of aerosol 172 by the heated aerosol-forming substrate 201.

In some example embodiments, the compression assembly 230 is configured to apply a compression force on the aerosol-forming substrate 201 to cause the aerosol-forming substrate 201 to be adjustably compressed to a substantially uniform, consistent packing density, even during and/or between separate generations of separate instances of aerosol 172. This may enable improved consistency and/or uniformity of separate instances of aerosol 172 formed by the aerosol-forming substrate 201 due to improved uniformity in the packing density of the aerosol-forming substrate 201 throughout the generation of the separate instances of aerosol 172. Said adjustable compression may further enable improved uniformity and consistency of properties of different instances of aerosol 172 generated by the aerosol-generating device 100 over time based on enabling improved uniformity and/or consistency of the packing density of the aerosol-forming substrate 201 in the enclosure 210 before, during, and after the formation of different instances of aerosol 172 by the aerosol-forming substrate. Additionally, such adjustable compression may enable adjustable control, including manual or automatic control, over said properties of different instances of aerosol 172, thereby enabling improved aerosol generation control through adjustable compression of the aerosol-forming substrate 201 by the compression assembly 230.

In some example embodiments, the compression plate 234 is permeable to gas flow and thus enables a gas (e.g., air 170, aerosol 172, aerosol 174, or the like) to pass between the opposite surfaces 234U and 234B through the thickness of the compression plate 234 and is configured to restrict the aerosol-forming substrate 201 from escaping the first region 208-1 of the enclosure into a remainder, second region 208-2 of the enclosure. For example, the compression plate 234 may be a screen, a plate with multiple holes and/or ports extending through the thickness thereof between opposite surface 234U and 234B (e.g., a perforated plate), any combination thereof, or the like. As a result, the compression plate 234 may be configured to direct aerosol 172 generated by the aerosol-forming substrate 201 to pass out of the first region 208-1, through the thickness of the compression plate 234, and into the second region 208-2 of the enclosure 210. The aerosol 172 in the first and/or second regions 208-1, 208-2 may be entrained and/or mixed with air 170 that is drawn into the first and/or second region 208-1, 208-2 of the enclosure 210, to form a mixture (e.g., aerosol 174). The mixture may be drawn out of the enclosure 210, towards the outlet of the aerosol-generating device 100 (e.g., outlet 130-O and/or outlet 116), via the outlet 206 of the heating chamber structure 200, for example based on a negative pressure being applied to the outlet of the aerosol-generating device 100. The compression plate 234 may be made of any material (e.g., steel), including any material that is chemically inert with regard to the aerosol-forming substrate 201.

In some example embodiments, the compression plate 234 is a solid plate, formed of any material (e.g., steel) that does not permit aerosol 172 to pass through the thickness of the compression plate 234 between the first and second regions 208-1, 208-2 of the enclosure 210. For example, air 170 may be drawn into at least the first region 208-1 via an inlet 204 that establishes fluid communication between the first region 208-1 of the enclosure 210 and an exterior of the heating chamber structure 200, and the air 170 that is drawn into the first region 208-1 may mix with aerosol 172 formed by the aerosol-forming substrate 201 while air in the second region 208-2 is isolated from the aerosol 172 by the solid compression plate 234. The air 170 and aerosol 172 in at least the first region 208-1 may be drawn out of the enclosure 210 via one or more outlet ports 206 as aerosol 174.

While FIGS. 1A-2C illustrate the one or more air inlets 204 as establishing fluid communication between the enclosure 210 and a separate interior space 182 of the aerosol-generating device 100 that is in fluid communication with the ambient environment 102 via a separate air inlet 114, it will be understood that, in some example embodiments, the interior space 182 may be omitted, and the inlet 204 may extend through portions of the heating chamber structure 200 that further define portions of the first housing 112 to the ambient environment 102. As a result, the inlet 204 is also an air inlet 114, establishes direct fluid communication between the enclosure 210 and the ambient environment 102 and thereby is configured to direct air 170 from the ambient environment 102 directly into the enclosure 210 when air is drawn through the aerosol-generating device 100 (e.g., when negative pressure is applied to the outlet 130-O).

As shown in FIGS. 1A-2C, in some example embodiments at least a portion of the heating chamber structure 200, for example piece of material 202-N, is a hatch structure, referred to herein as hatch 290. The hatch 290 may be at least partially detachable from a remainder of the heating chamber structure pieces of material 202-1 to 202-(N−1) to directly or more directly expose the enclosure 210 to the ambient environment 102. The compression assembly 230, for example the compression actuator 232, may be fixed to the hatch 290 such that at least partial detachment of the hatch 290 from the remainder of the heating chamber structure pieces of material 202-1 to 202-(N−1) may enable the compression assembly 230 to be at least partially removed from the enclosure 210, thereby directly exposing a portion of the enclosure 210 that is defined by the first surface 203-1 to the ambient environment 102. As a result, removal and/or addition of the aerosol-forming substrate 201 in the enclosure 210 may be enabled, and such removal and/or addition of aerosol-forming substrate 201 may be implemented manually. In some example embodiments, the heating chamber structure 200 is configured to enable manual control over the amount and/or type(s) of aerosol-forming substrate 201 located in the enclosure 210 and heated to form aerosol 172. Accordingly, control over the properties of the aerosol 172/174 (e.g., composition, density, etc.) may be improved.

The hatch 290 may be any known type of hatch structure, including a structure that is hingedly connected to a remainder of the heating chamber structure 200, a structure that is configured to be completely detached from the remainder of the heating chamber structure 200 and is configured to be detachably connected to the heating chamber structure 200 via any known connector interfaces (e.g., friction fit connectors, interlock connectors, magnetic connectors, etc.), or the like. In some example embodiments, no piece of material 202-1 to 202-N of the heating chamber structure 200 is configured to be even partially detached from a remainder of the heating chamber structure 200, such that hatch 290 may be omitted and manual loading of aerosol-forming substrate 201 in the enclosure 210 may be inhibited. Such inhibition may render at least the heating chamber structure 200, and the first section 110 housing same, to be non-reusable upon depletion of the aerosol-forming substrate 201 located in the enclosure 210.

FIGS. 3A, 3B, 3C, and 3D are views of compression assemblies shown in region A of FIG. 2B, according to some example embodiments.

Referring to FIGS. 3A-3D, the compression actuator 232 may be any known type of linear actuator configured to induce linear movement 309A and/or 309B of the compression plate 234, in a direction that is normal to at least a portion of the bottom surface 234B of the compression plate 234 (e.g., in a direction along axis 301), towards or away from the first surface 203-1 of the heating chamber structure 200.

Figure 3D:
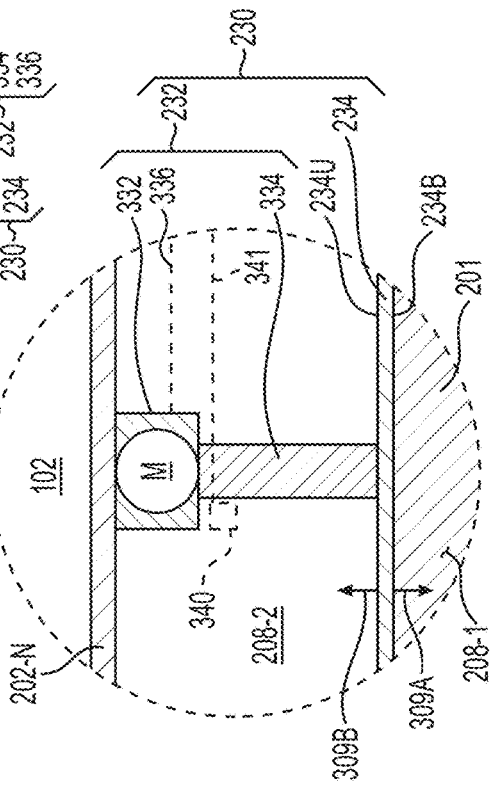
Figure 3A:
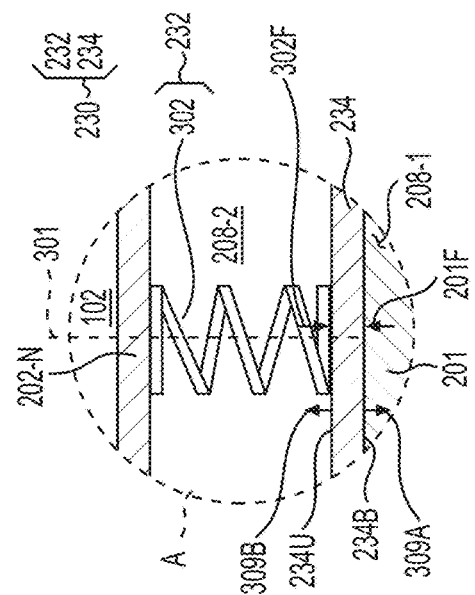

Referring to FIG. 3A, the compression actuator 232 may include a spring 302 that is configured to exert a particular spring force 302F on the compression plate 234 to push the compression plate 234 away from a portion of the heating chamber structure 200 to which the spring is fixed (e.g., piece of material 202-N) and towards the first surface 203-1 (e.g., push the compression plate 234 to move "downwards"), in a downward, compressing linear motion 309A. The spring 302 may push the compression plate 234 "downwards" (309A) to compress the aerosol-forming substrate 201 in the first region 208-1. Such downward linear motion 309A and resulting compression of the aerosol-forming substrate 201 may continue until a countering force 201F exerted by the compressed aerosol-forming substrate 201 on the compression plate 234, in an opposite direction in relation to the direction of the spring force 302F exerted on the compression plate 234, matches the magnitude of the spring force 302F. As a result of the countering force 201F matching the spring force 302F, the downwards, compressing linear movement 309A of the compression plate 234 is stopped. Accordingly, at least a particular packing density of the aerosol-forming substrate 201 that causes the compressed aerosol-forming substrate 201 to exert a countering force 201F on the compression plate 234 that matches the spring force 302F of spring 302 may be maintained, and the spring 302 may thus maintain a constant amount of compression, that is associated with the magnitude of the spring force 302F, by the compression plate 234 on the aerosol-forming substrate 201. As the aerosol-forming substrate 201 releases aerosol 172, the mass, volume, and/or density of the aerosol-forming substrate 201 may decrease. As a result of such decrease, the countering force 201F may decrease. The spring 302 may then push the compression plate 234 further downwards (309A), towards the first surface 203-1 of the heating chamber structure 200 and thus compressing the aerosol-forming substrate 201, until equilibrium between the spring force 302F and the countering force 201F exerted by the compressed aerosol-forming substrate 201 is re-established to stop the downwards, compressing linear movement 309A of the compression plate 234. As a result, a particular amount of compression exerted by the compression assembly 230 on the aerosol-forming substrate 201, determined based on the spring force 302F, is maintained even as the mass, volume, and/or density of the aerosol-forming substrate 201 changes over time. Thus, the packing density of the aerosol-forming substrate 201 may be kept more consistent, at a magnitude that corresponds to the spring force 302F of spring 302, throughout the formation of multiple instances of aerosol 172 by the aerosol-forming substrate 201. The spring 302 may be configured to exert a constant, fixed magnitude of spring force 302F over at least a portion of the range of linear motion 309A and/or 309B of the compression plate 234 within the enclosure 201.

The upward linear motion 309B of the compression plate 234 may be caused by an external force (e.g., countering force 201F) exerted on the compression plate 234 that is opposite in direction to, and greater in magnitude than, the spring force 302F. In some example embodiments, the countering force 201F may exceed the spring force 302F, even briefly, for example based on the countering force 201F including a combined force exerted on the compression plate 234 by both the aerosol-forming substrate 201 and an aerosol 172 released by the aerosol-forming substrate 201. Such combined force may provide a countering force 201F that may exceed the spring force 302F in magnitude and cause upward linear motion 309B of the compression plate 234. The compression plate 234 may later be caused to move downwards 309A after the aerosol 172 generation has ended, and the combined countering force 201F becomes equal to or less than the spring force 302F.

Referring to FIG. 3B, the compression actuator 232 may be any known type of screw actuator, including a screw nut 312 and a screw shaft 314, wherein rotation 319 of the screw nut 312 around a longitudinal axis 301 thereof induces linear motion of the screw shaft 314. The screw shaft 314 may be fixed to the compression plate 234, and the screw nut 312 may be fixed (e.g., via a bearing 316) to a portion of the heating chamber structure 200 (e.g., piece of material 202-N), so that rotation 319 of the screw nut 312 around axis 301 causes linear motion of the screw shaft 314, and thus downward linear motion 309A of the affixed compression plate 234, towards the first surface 203-1 in the direction that is normal to the bottom surface 234B of the compression plate 234 along axis 301. The rotation 319 may be in different, opposite rotational directions to cause downwards linear motion 309A or upwards linear motion 309B of the compression plate 234.

In some example embodiments, the screw actuator may include a manual interface 318, for example one or more rods as shown, located outside the first housing 112 and exposed to the ambient environment 102. The manual interface 318 may be configured to be manually manipulated to enable manual control over the rotation 319 of the screw nut 312 around axis 301. Accordingly, manual control over the linear motion 309A and/or 309B of the compression plate 234, and thus manual control over the compression of the aerosol-forming substrate 201 in the first region 208-1 by the compression plate 234, may be enabled. The packing density of the aerosol-forming substrate 201, and thus the properties of the aerosol 172/174 formed thereby upon heating by the heater 220, may be manually controlled, and thus manual control over the properties of the aerosol 172 may be improved.

Figure 3C:
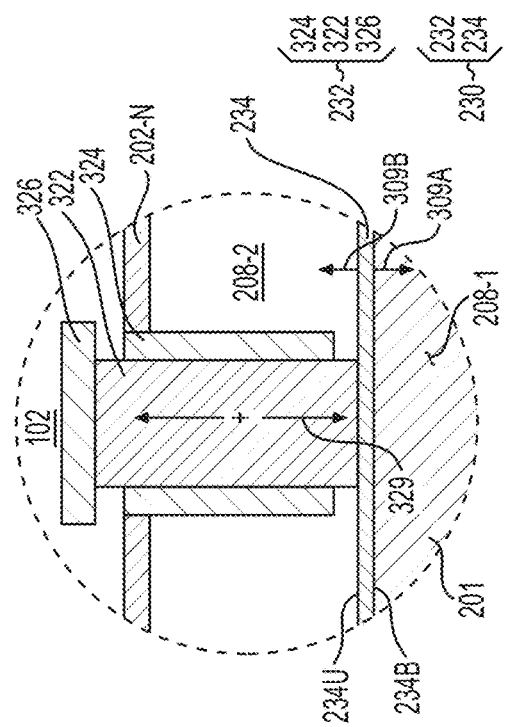

Referring to FIG. 3C, the compression actuator 232 may be any known type of plunger actuator, including a guide shaft 324 that may be fixed to a portion of the heating chamber structure (e.g., piece of material 202-N), a plunger cylinder 322 configured to move downwards or upwards (e.g., towards or away from the first surface 203-1) within the guide shaft 324 and having a longitudinal axis that is coaxial with the longitudinal axis of the guide shaft 324 (e.g., axis 301), where the plunger cylinder 322 may be fixed to the compression plate 234. The plunger cylinder 322 may move 329 at least partially through the guide shaft 324, in the direction of the longitudinal axis of the guide shaft 324 and the plunger cylinder 322 (e.g., axis 301). Such motion 329 may cause downward linear motion 309A or upward linear motion 309B of the compression plate 234 that is fixed to the plunger cylinder 322.

As further shown in FIG. 3C, the plunger actuator may include a manual interface 326 that may be located outside the first housing 112 and exposed to the ambient environment 102, where the manual interface 326 may be configured to be manually manipulated to enable manual control over the linear, downward or upward movement 329 of the plunger cylinder 322 in relation to the guide shaft 324. Thus, manual control over the linear motion 309A and/or 309B of the compression plate 234, and thus manual control over the compression of the aerosol-forming substrate 201 in the first region 208-1 by the compression plate 234, may be enabled. Accordingly, the packing density of the aerosol-forming substrate 201, and thus the properties of the aerosol 172 formed thereby upon heating by the heater 220, may be manually controlled, and thus manual control over the properties of the aerosol 172 may be improved.

Referring to FIG. 3D, the compression actuator 232 may include a motor 332 that may operate an actuator element 334 (e.g., a rod configured to be engaged by the motor 332) to cause downward linear motion 309A and/or upward linear motion 309B of the compression plate 234. The motor 332 may operate based upon a supply of electrical power from the control system 140 via one or more electrical leads 336 that electrically couple the motor 332 to the control system 140 (e.g., to the controller 144 and/or to the power supply 142) via one or more sets of conductive elements (e.g., conductive elements 118-C, 128-C, electrical leads 144-C, 148, etc.). In FIG. 3D, the actuator element 334 may be any of the actuator elements shown in FIGS. 3A-3C, for example spring 302, screw actuator elements 312 and/or 314, plunger actuator elements 322 and/or 324, any combination thereof, or the like. In some example embodiments, actuator element 334 may be any known actuator element used to convert operation of the motor 332 into linear motion of a coupled element (e.g., compression plate 234). The motor 332 may be any known motor or servomechanism, including any known motor or servomechanism configured to operate, based on received electrical power, to induce linear motion of one or more structures coupled to the motor or servomechanism.

In some example embodiments, the controller 144 may control the supply of electrical power from power supply 142 to the motor 332 to control the compression of aerosol-forming substrate 201 in the enclosure 210. Restated, in some example embodiments the aerosol-generating device 100 may include a control system 140, that may include at least the controller 144, that is configured to control the motor 332 to adjustably control compression of the aerosol-forming substrate 201 in the enclosure 210 based on adjustably controlling the linear motion 309A and/or 309B of the compression plate 234. As shown in FIGS. 2B-2C and 3D, in some example embodiments, the motor 332 may be electrically coupled to the control system 140 via one or more sets of conductive elements (e.g., electrical leads 336, conductive elements 118-C, 128-C, electrical leads 144-C, 148, etc.) that establish an electrical circuit between the motor 332 and the control system 140. This may enable the controller 144 to control the supply of electrical power from the power supply 142 to the motor 332 to thus control compression of the aerosol-forming substrate 201 based on controlling the operation of the motor 332.

As shown in FIGS. 2B-2C and 3D, in some example embodiments, the aerosol-generating device 100 includes a force sensor 340 which may be electrically coupled to the controller 144 via any well-known elements to establish the electrical coupling (e.g., leads 341, conductive elements 118-C, 128-C, electrical leads 144-C, 148, etc.). The force sensor 340 may be any well-known force sensor (e.g., a compression sensor, strain sensor, etc.) configured to generate an output signal (e.g., force sensor signal) based on compression of the aerosol-forming substrate 201 against the first surface 203-1 in the first region 208-1 by the compression assembly 230. Thus, the output signal may indicate a magnitude of compression of the aerosol-forming substrate 201 by the compression plate 234. Such a magnitude of compression may be referred to herein as simply a "compression value." The force sensor signal may be generated by the force sensor 340 and transmitted to the controller 144. The controller 144 may process the force signal to determine a magnitude of compression of the aerosol-forming substrate 201 (e.g., determine a compression value). The controller 144 may generate one or more output signals to the motor 332 and/or adjustably control the supply of electrical power from the power supply 142 to the motor 332, for example based on comparing the compression value against a target compression value stored at the controller 144 and, in response to the comparison, generating an output signal determined to cause adjustment of the compression value to approach or match the target compression value. Such output signals may cause adjustable control of the compression of the aerosol-forming substrate 201 based on adjustably controlling the operation of the motor 332. Thus, a feedback system to adjust and/or maintain the compression of the aerosol-forming substrate 201 at a desired, or "target" magnitude and/or within a desired, or "target" range of magnitudes (e.g., a target compression value and/or target compression value range) may be provided. In some example embodiments, the force sensor 340 may be absent from an aerosol-generating device 100 that includes the compression assembly 230 shown in FIG. 3D.

In some example embodiments, the controller 144 is configured to monitor the operation of the motor 332 to determine a position and/or magnitude of movement of the compression plate 234 within the enclosure 210, for example based on processing the determined position of the compression plate 234 in relation to the first surface 203-1. The controller 144 may access a stored relationship (e.g., stored at the controller 144) between motor operation and linear movement 309A and/or 309B of the compression plate 234 (e.g., net or cumulative downward linear motion 309A) from an initial start position in the enclosure. The location of the initial start position of the compression plate 234 in the enclosure 210 may be stored and known to the controller 144. The controller 144 may access the stored relationship to determine how far the compression plate 234 has moved from the start position due to operation of the motor 332. The controller 144 may monitor the movement of the compression plate 234 over time, as the aerosol-forming substrate 201 is gradually depleted. The controller 144 may inhibit further heater 220 operation in response to determining that the position of the compression plate 234 has moved by at least a threshold distance from the initial start position within the enclosure 210 (e.g., the cumulative and/or net downward linear movement 309A at least meets a threshold value). The stored relationship may include an empirically-generated look-up table that associates values indicating a quantity of rotations of motor 332, as indicated by cumulative output signals generated by the controller 144 from a start time (e.g., cumulative electric current supplied to the motor 332 from a particular start time which may be the first time at which electrical power is caused to be supplied to the motor 332 by the controller 144), and resulting cumulative downward linear movement 309A and/or net downward linear movement 309A distance of the compression plate 234 since the particular start time.

In some example embodiments, the aerosol-generating device 100 may include one or more position sensors 360 that are electrically coupled to the control system 140 via at least electrical lead 361. The position sensors 360 may each be configured to generate a signal indicating that the compression plate 234 is at a separate location in the enclosure 210 that corresponds to a location of the respective position sensor 360 in the enclosure 210. At least one particular position sensor 360 may be configured to generate a signal indicating that the compression plate 234 is at a corresponding location in the enclosure 210 that corresponds to a threshold minimum volume of the first region 208-1. Controller 144 may be configured to, in response to receiving a signal from the at least one particular position sensor 360, inhibit further heater 220 operation, for example based on inhibiting further supply of electrical power to the heater 220. The one or more position sensors 360 may be may be any well-known sensor configured to generate a sensor signal indicating a position of an element within an enclosure (e.g., a contact sensor configured to generate a signal in response to contact with the compression plate 234). In some example embodiments, the aerosol-generating device 100 may not include any position sensors 360.

Referring back to FIGS. 2A-2C, in some example embodiments, the aerosol-generating device 100 includes a temperature sensor 350 that may be electrically coupled to the controller 144 via any well-known elements to establish the electrical coupling (e.g., leads 351, conductive elements 118-C, 128-C, electrical leads 144-C, 148, etc.). The temperature sensor 350 may be any well-known temperature sensor (e.g., a thermistor) configured to generate an output signal (e.g., temperature sensor signal) that indicates a temperature value associated with the heated aerosol-forming substrate 201. The temperature value may be a temperature of the heater 220, a temperature of the first surface 203-1, and/or a temperature of aerosol-forming substrate 201 in the first region 208-1 during the generation of heat 222 by the heater 220 and/or the generation of aerosol 172 by the aerosol-forming substrate 201. The temperature sensor signal may be output to the controller 144, and the controller 144 may determine the aforementioned temperature value based on processing the received temperature sensor signal. In some example embodiments, the controller 144 may adjust and/or maintain the determined temperature value based on adjusting and/or maintaining the amount of electrical power supplied from the power supply 142 to the heater 220 in future activations of the heater 220 to generate future instances of aerosol 172, in response to processing the temperature sensor signal, for example to approach or maintain the temperature value within a particular desired, or "target" temperature value range and/or to approach or match a particular desired, or "target" temperature value (for example, to mitigate a risk of combustion of the aerosol-forming substrate 201).

In some example embodiments, temperature sensor 350 may be absent, and the controller 144 may be configured to determine a temperature value that is a temperature of the heater 220, a temperature of the first surface 203-1, and/or a temperature of aerosol-forming substrate 201 in the first region 208-1. Such determination may be based on monitoring the supply of electrical power from the power supply 142 to the heater 220, determining the resistance of the heater 220 based on said monitoring (e.g., assuming known resistance values of the electrical elements (e.g., electrical leads 224, 144-C, conductive elements 118-C, 128-C of interfaces 118, 128, etc.)), and accessing a look-up table (generated via well-known empirical techniques to associate heater 220 resistance with temperature of the heater 220, first surface 203-1, and/or aerosol-forming substrate 201 during heat 222 generation and/or aerosol 172 generation) to determine a temperature value that corresponds to the determined resistance value. The controller 144 may be configured to adjust the amount electrical power supplied from the power supply 142 to the heater 220 in future activations of the heater 220 to generate future instances of aerosol 172 to adjust the determined temperature value to match or at least approach a target temperature value or be within a target temperature value range.

The controller 144 may receive a force sensor signal from a force sensor 340 and may process the signal based on accessing a look-up table. The look-up table may associate force sensor signal magnitudes with compression values. The look-up table may associate motor 332 control signals (e.g., cumulative electrical power caused to be supplied to the motor 332 by the controller 144 since a particular start time) with corresponding compression values and/or changes thereof. The look-up table may associate amounts of electrical power to supply from the power supply 142 to the motor 332 with corresponding compression values and/or changes thereof. Such look-up tables may be generated via well-well-known empirical techniques to associate changes in compression indicated by force sensor 340 output signals with changes in the supply of electrical power to the motor 332.

Based on processing a force sensor signal received from a force sensor 340, the controller 144 may determine the compression value indicating the magnitude of the compression of the aerosol-forming substrate 201 by the compression assembly 230. The controller 144 may compare the determined compression value with a target compression value and/or target compression value range. In response to a determination that the determined compression value does not match the target compression value and/or is outside the target compression value range, the controller 144 may access a look-up table to determine an output signal to the motor 332, and/or an amount of electrical power to allow to be supplied from the power supply 142 to the motor 332, that is associated in the look-up table with a corresponding change in compression between the determined compression value and the target compression value or the center of the target compression value range. The controller 144 may thereby cause the determined output signal and/or amount of electrical power to be supplied to the motor 332 to cause the compression assembly 230 to change the compression of the aerosol-forming substrate 201 to approach or match the target compression value or be within the target compression value range (e.g., at least reduce the difference between the determined compression value and the target compression value and/or the target compression value range). Accordingly, it will be understood that the control system 140 may be configured to control the motor 332 to adjustably control compression of the aerosol-forming substrate 201 based on processing force sensor signal(s) generated by the force sensor 340.

The controller 144 may receive a temperature sensor signal from a temperature sensor 350 and/or determine a resistance of the heater 220 via well-known techniques for determining resistance of a portion of an electrical circuit based on monitoring the supply of electrical power (e.g., electrical current) through at least the portion of the electrical circuit). The controller 144 may process the signal based on accessing a look-up table to determine the temperature value associated with the aerosol-forming substrate 201. The look-up table may associate temperature sensor signal and/or resistance magnitudes with temperature values. Such look-up tables may be generated via well-well-known empirical techniques to associate temperature sensor signal values and/or heater 220 resistance values with said temperature values associated with the aerosol-forming substrate. The controller 144 may compare the determined temperature value with a reference (e.g., desired, target, etc.) temperature value. In response to a determination that the determined temperature value does not match the reference temperature value and/or is outside the reference temperature value range, the controller 144 may access a look-up table to determine an amount of electrical power to allow to be supplied from the power supply 142 to the heater 220, and/or a change in supplied electrical power, that is associated in the look-up table with a corresponding change in temperature between the determined temperature value and the reference temperature value (and/or a proximate boundary value of the reference temperature value range). The controller 144 may then cause the heater 220 to change the determined temperature (determined based on future received temperature sensor signals and/or resistance measurements) to approach and/or match the reference temperature value or be within the reference temperature value range (e.g., at least reduce the difference between the determined temperature value and the reference temperature value and/or reference temperature value range). Accordingly, it will be understood that the control system 140 may be configured to adjust the supply of electrical power to the heater 220 based on determining a temperature value associated with the aerosol-forming substrate 201 in the first region 208-1 during heating by the heater 220, so that the determined temperature approaches a target temperature value or target range of temperature values.

It will be understood that all look-up tables that associate one set of values with another set of values, as described herein, may be created through well-well-known empirical techniques for generating the corresponding sets of values.

FIG. 4A is a perspective cross-sectional view of a first section of an aerosol-generating device, according to some example embodiments. FIGS. 4B-4C are cross-sectional views of the first section of the aerosol-generating device of FIG. 4A, along cross-sectional view line IVB-IVB' of FIG. 4A, according to some example embodiments.

In some example embodiments, at least the first section 110 of the aerosol-generating device 100 may be configured to be detached into at least two separate pieces, so as to expose the enclosure 210, and further directly expose a bottom region 410-1 of the enclosure 210 that is directly bounded by first surface 203-1, to the ambient environment 102. Accordingly, direct manual addition or removal ("loading") of aerosol-forming substrate 201 into the enclosure 210 may be enabled. In the example embodiments shown in FIGS. 4A-4C, the first section 110 may include interfaces 402, 404, which may be any type of connector interface, similarly to interfaces 118, 128 as described above. As shown, interfaces 402, 404 may be detachably connected to each other to establish the closed enclosure 210, and the interfaces 402, 404 may be detached from each other to split the first section 110 into separate pieces 110-1, 110-2 that may be further connected back together via re-connecting the interfaces 402, 404. While the interfaces 402, 404 are detached from each other, as shown in FIG. 4C, the enclosure 210 may be opened and split into separate open enclosures: bottom region 410-1 that is an open enclosure defined by inner surfaces of the piece 110-1 that includes the first surface 203-1, and top region 410-2 that is an open enclosure defined by inner surfaces of the piece 110-2. The bottom region 410-1 may be directly exposed to the ambient environment 102 based on the interfaces 402, 404 being detached from each other, thereby enabling manual loading (e.g., removal and/or addition) of aerosol-forming substrate 201 in the bottom region 410-1. The interfaces 402, 404 may then be re-connected to close the enclosure 210 and enable compression and heating of the aerosol-forming substrate 201 in the enclosure 210, including any newly-added aerosol-forming substrate 201.

In FIGS. 4A-4C, the compression assembly 230 is entirely included in the piece 110-2 being fixed, at the compression actuator 232, to a portion of the heating chamber structure 200 that defines a portion of the first housing 112 of piece 110-2. However, example embodiments are not limited thereto, and some or all of the compression assembly 230 may be affixed to one or more portions of the heating chamber structure 200 included in piece 110-1, such that movement and/or detachment of the compression assembly 230 may be performed to directly expose the bottom region 410-1 of the enclosure 210 to the ambient environment 102 to enable loading of aerosol-forming substrate 201 therein.

As shown in FIGS. 4A-4B, in some example embodiments, interior spaces 182 and 184 may be omitted, and the inlet 204 may extend through portions of the heating chamber structure 200 that define part of the first housing 112 so as to extend directly between the enclosure 210 and the ambient environment 102. Thus, the inlet may also be an air inlet 114. The outlet 206 may extend through a thickness of the first housing 112 between the second region 208-2 of the enclosure 210 and an exterior of the first housing 112, which may be inlet 130-I if outlet assembly 130 is not omitted from the aerosol-generating device 100. Accordingly, in the example embodiments shown in FIGS. 4A-4C, air 170 may be drawn directly into the enclosure 210 from the ambient environment 102 via the inlet 204. The air 170 and aerosol 172 may be drawn, as aerosol 174, directly from the enclosure 210 and through the outlet 206 to either the outlet conduit 130-C or directly to an exterior of the aerosol-generating device 100 if the outlet assembly 130 is omitted.

Figure 5A:
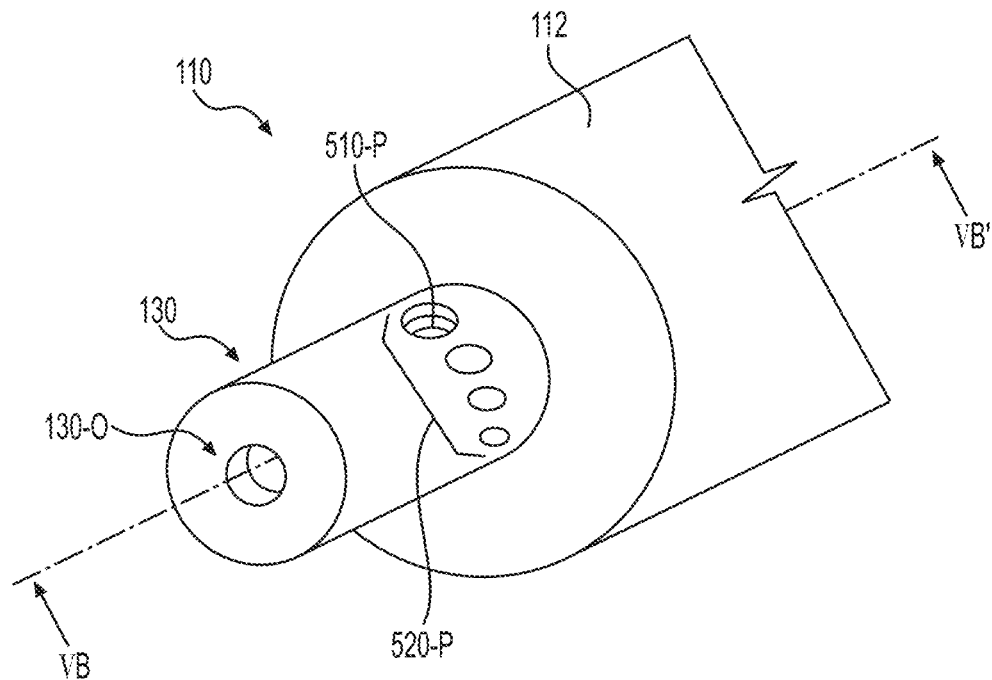
FIG. 5A is a perspective view of an outlet assembly of an aerosol-generating device, according to some example embodiments.
Figure 5B:
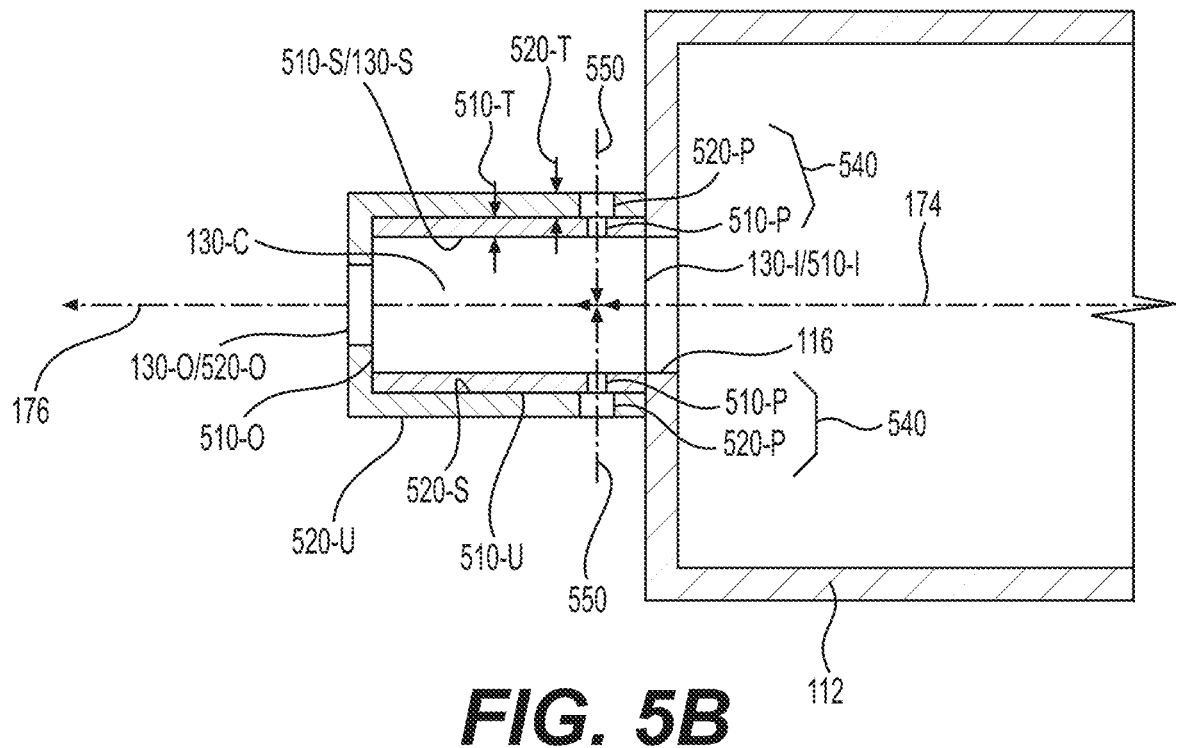
FIG. 5B is a cross-sectional view, along view line VB-VB', of the outlet assembly of FIG. 5A, according to some example embodiments.

FIG. 5A is a perspective view of an outlet assembly 130 of an aerosol-generating device, according to some example embodiments. FIG. 5B is a cross-sectional view, along view line VB-VB', of the outlet assembly of FIG. 5A, according to some example embodiments.

In some example embodiments, the outlet assembly 130 includes an inner shell 510 and an outer shell 520. The inner shell 510 is fixed to the first housing 112 and the inner and outer shells 510, 520 are coaxial in longitudinal axis. An inner surface 520-S of the outer shell 520 covers an outer surface 510-U of the inner shell 510. The outer shell 520 is configured to rotate around the longitudinal axis of the outer shell 520 (which is coaxial with the longitudinal axis of the inner shell 510). The inner surface 510-S of the inner shell 510 at least partially defines the inner surface 130-S of the outlet assembly 130. The inner surface 510-S thus at least partially defines the outlet conduit 530-C extending from inlet 510-I that is directly open to the outlet 116 to an outlet 510-O that is covered by a portion of the outer shell 520 that includes an outlet 520-O. Thus, the outlet assembly 130 defines a fluid conduit extending from outlet 116 to outlet 520-O, via the outlet conduit 130-C extending through an interior of the outlet assembly 130. Accordingly, referring back to FIG. 1B, the inlet 510-I may be the same as the inlet 130-I shown in FIG. 1B, and the outlet 520-O may be the same as the outlet 130-O shown in FIG. 1B. It will be understood that the outlet 130-O/520-O is directly exposed to an exterior of the aerosol-generating device 100, and the inlet 130-I/510-I is exposed to the outlet 206 of the heating chamber structure 200, such that aerosol 174 drawn out of the enclosure 210 may be drawn through the inlet 130-I/510-I and further drawn though the outlet conduit 130-C and through the outlet 130-O/520-O to an exterior of the aerosol-generating device 100.

Still referring to FIGS. 5A-5B, in some example embodiments, the inner shell 510 includes one or more ventilation air ports 510-P extending through a thickness 510-T of the inner shell 510 between opposite surfaces 510-S and 510-U thereof. The outer shell 520 includes one or more ventilation air ports 520-P extending through a thickness 520-T of the outer shell 520 between opposite surfaces 520-S and 520-U thereof. In some example embodiments, the outer shell 520 may be rotated around the common longitudinal axis of the shells 510, 520 to adjustably align at least one ventilation air port 520-P of the outer shell 520 with at least one ventilation air port 510-P of the inner shell, thereby adjustably establishing a ventilation flow conduit 540 from the ambient environment 102 into the outlet conduit 530 independently of either inlet 510-I/130-I or outlet 520-O/130-O. As shown in FIG. 5B, when aerosol 174 is drawn through the aerosol-generating device 100, for example based on a negative pressure being applied to outlet 130-O, aerosol 174 is drawn through outlet 116, through the outlet conduit 130-C, and out of the outlet assembly 130 and the aerosol-generating device 100 via outlet 130-O. As further shown in FIG. 5B, when at least one ventilation air port 520-P is aligned with at least one ventilation air port 510-P to establish a ventilation flow conduit 540 into the outlet conduit 130-C, ventilation air 550 may be drawn into the outlet conduit 530-C independently of the outlet 116, independently of the inlet 130-I/510-I, and independently of the outlet 130-O/520-O, for example based on the negative pressure being applied to outlet 130-O. The ventilation air 550 may mix with the aerosol 174 to form a mixture of aerosol 174 and ventilation air 550, referred to herein as aerosol 176 that thereby dilutes the concentration of aerosol 172/174 in the flow of the aerosol 176 that is drawn out of the aerosol-generating device 100 via outlet 130-O. Said ventilation may further reduce the flow rate of air 170 drawn into the aerosol-generating device 100.

As shown in FIGS. 5A-5B, the outer shell 520 may include a set of multiple ventilation air ports 520-P that have different sizes (e.g., different cross-sectional flow areas, diameters, etc.). The outer shell 520 may be rotated to align different ventilation air ports 520-P of different sizes with a ventilation air port 510-P that may have a size (e.g., cross-sectional flow area, diameter, etc.) that may be larger, smaller, or the same size as the sizes of one or more ventilation air ports 520-P. Based on different ventilation air ports 520-P being aligned with the ventilation air port 510-P, the effective cross-sectional flow area of the established ventilation flow conduit 540 may be controlled and/or adjusted. Thus, the flow rate of ventilation air 550 and thus the dilution of aerosol 172/174 within aerosol 176 thereby may be adjustably controlled. As a result, the outlet assembly 130 may enable manual control over the concentration of aerosol 172/174 in the flow of aerosol 176 that is drawn through outlet 130-O/520-O, thereby improving operation of the aerosol-generating device 100.

In some example embodiments, the outer shell 520 may be rotated so that no ventilation air ports 520-P are aligned with any ventilation air ports 510-P, such that the one or more ventilation air ports 510-P are occluded, no ventilation air 550 is drawn into the outlet conduit 130-C, and the aerosol 172/174 is not diluted at all by any ventilation air 550.

While FIGS. 5A-5B illustrate that outer shell 520 includes multiple ventilation air ports 520-P having different diameters that may be adjustably aligned or mis-aligned with a given ventilation air port 510-P of the inner shell 510, it will be understood that example embodiments are not limited thereto. In some example embodiments, the outer shell 520 may include a ventilation air port 520-P that may be adjustably aligned or mis-aligned with multiple, separate ventilation air ports 510-P of the inner shell 510 that have different sizes to thus enable adjustable control over the magnitude of the ventilation air 550 flow rate into the outlet conduit 130-C to enable adjustable control over the concentration of aerosol 174 in the flow of aerosol 176 drawn through outlet 130-O/520-O.

It will be understood that in some example embodiments, the outlet assembly 130 may be omitted entirely from the aerosol-generating device 100, and the outlet 116 may be the outlet of the aerosol-generating device 100.

Figure 6:
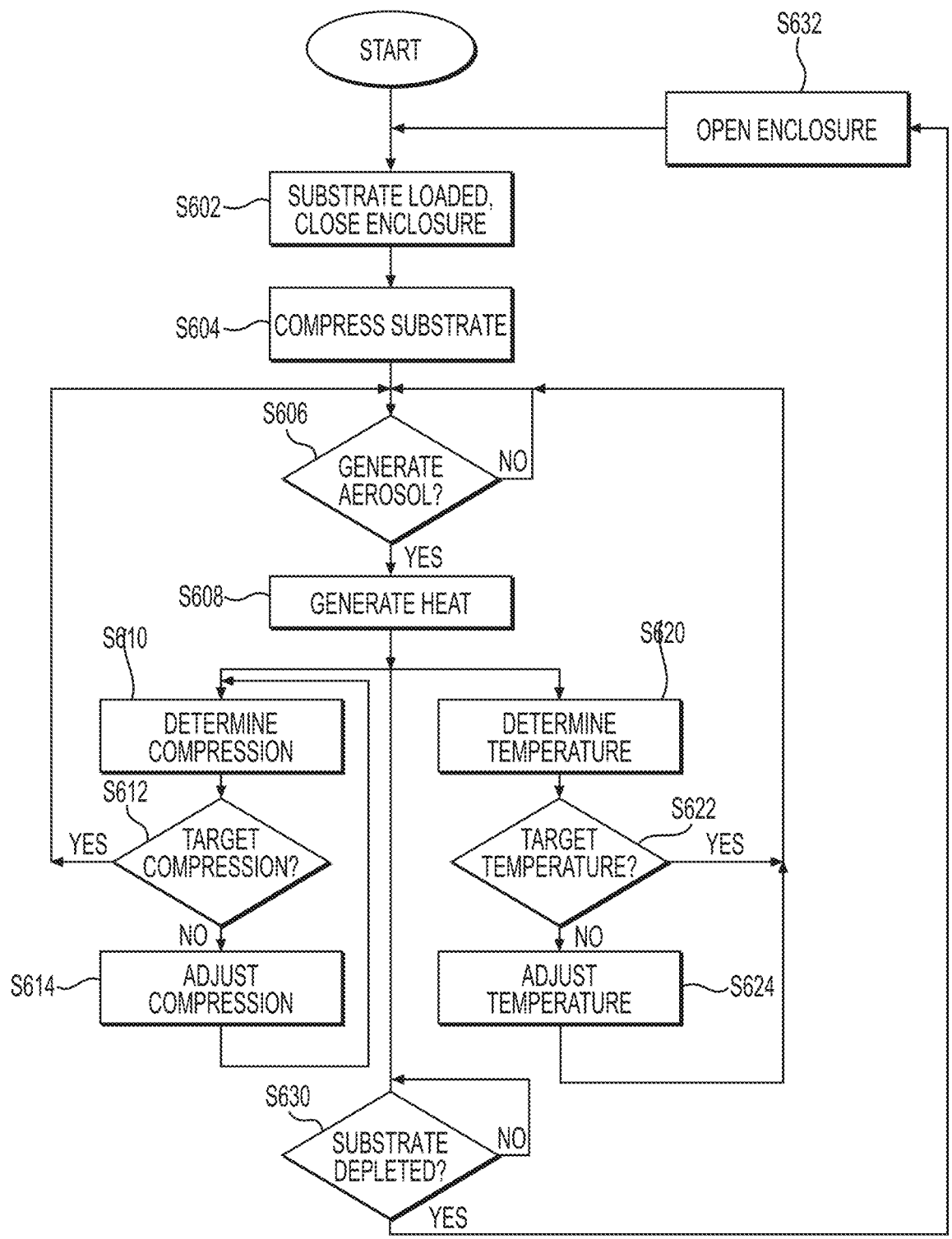
FIG. 6 is a flowchart illustrating a method for operating an aerosol-generating device according to some example embodiments.

FIG. 6 is a flowchart illustrating a method for operating an aerosol-generating device according to some example embodiments. The method shown in FIG. 6 may be implemented, in part or in full, by some or all of any example embodiments of aerosol-generating device 100, including, for example, a controller 144 of the aerosol-generating device 100. It will be understood that the operations shown in FIG. 6 may be implemented in different order than shown in FIG. 6, and some operations shown in FIG. 6 may be omitted and/or implemented by various different entities (e.g., other than the aerosol-generating device 100).

At S602, an aerosol-forming substrate 201 may be added to a region of an enclosure 210 of the heating chamber structure 200 of the aerosol-generating device 100. The enclosure 210 may be closed (e.g., sealed) based on separate pieces of the heating chamber structure 200 being connected to each other to complete the definition of the enclosure 210 as a closed enclosure within the interior of the heating chamber structure 200. In some example embodiments, the closing of the enclosure 210 may be reversible, for example implemented based on closing a hatch 290 of the heating chamber structure 200 that may be later at least partially detached to enable future addition and/or removal of aerosol-forming substrate 201 in the enclosure 210. In some example embodiments, the closing of the enclosure 210 may be irreversible, such that future addition and/or removal of aerosol-forming substrate 201 in the enclosure is inhibited, thereby configuring the portion of the aerosol-generating device 100 that includes the heating chamber structure 200 to be disposable upon depletion of the aerosol-forming substrate 201.

Upon closure of the enclosure 210, the aerosol-forming substrate 201 is in a first region 208-1 of the enclosure 210 that is at least partially defined by first surface 203-1 and the opposing bottom surface 234B of the compression plate 234 of the compression assembly 230.

At S604, the compression assembly 230 compresses the aerosol-forming substrate 201 in the first region 208-1 against the first surface 203-1. The magnitude of the compression may be based on an inherent property of an element of the compression actuator 232 (e.g., a spring force that a spring 302 of the compression actuator 232 is configured to exert) and/or a force applied to the compression actuator 232 to cause the actuator to induce linear movement 309A and/or 309B of the compression plate 234 (e.g., rotation 319 of a screw nut 312 of the compression actuator 232, movement 329 of a plunger cylinder 322 of the compression actuator 232, operation of a motor 332 of the compression actuator 232 based on electrical power supplied thereto from power supply 142, any combination thereof, or the like).

In some example embodiments, where the compression actuator 232 includes a motor 332, operation S604 may include the controller 144 controlling the motor 332 to implement a particular magnitude of compression of the aerosol-forming substrate 201 by the compression plate 234 and/or linear movement 309A and/or 309B of the compression plate 234. The controller 144 may access a stored target initial movement and/or compression value and may control the motor 332 to cause the compression assembly 230 to achieve the target value. For example, where the target value is a target initial movement value, the controller 144 may determine a magnitude of linear movement 309A and/or 309B to be caused by the motor 332. The controller 144 may further determine (e.g., based on accessing a look-up-table generated according to well-well-known empirical techniques) an amount of electrical power to cause to be supplied from the power supply 142 to the motor 332 to cause the motor 332 to implement the particular magnitude of linear movement 309A and/or 309B of the compression plate 234. In another example, where the target value is a target compression value, the controller 144 may control the electrical supply from the power supply 142 to the motor 332, in coordination with processing force sensor signals received from a force sensor 340, to cause the motor 332 to operate to increase compression until the force sensor signals received from the force sensor 340 indicate that the target magnitude of compression of the aerosol-forming substrate 201 is reached.

At S606, a determination is made regarding whether to cause the aerosol-forming substrate 201 to generate an aerosol 172, based on causing heater 220 to generate heat 222. Such determination may be made based on determining whether signal(s) are received from a sensor 146 and/or interface 149 of the aerosol-generating device 100. In response to receiving signal(s) indicating a draw of air flow through the aerosol-generating device 100 (e.g., signal(s) from sensor 146 responsive to air 170 and/or 170A being drawn into the aerosol-generating device 100), the signal(s) may be processed to determine whether the following internal conditions exist: (1) a direction of the air flow indicates a draw of air flow through the aerosol-generating device 100 (versus blowing air through the aerosol-generating device 100), and/or (2) a magnitude of the air flow exceeds a threshold value. In some example embodiments, only one condition may be sufficient to activate the heater 220, while in other examples, two conditions or all conditions may have to be met before activating the heater 220. In addition or alternatively, a determination may be made whether the following internal condition exists: (3) a signal is received from interface 149 indicating that the interface 149 has been interacted with, such indication indicating that aerosol 172 generation is commanded (e.g., through manual interaction with the interface 149). If some or all of these internal conditions are determined by controller 144 to be met (e.g., S606=YES), the controller 144 may selectively electrically connect the power supply 142 to the heater 220, e.g., operating a switch included therein to close the aforementioned electrical circuit that includes the power supply 142 and the heater 220, thereby activating the heater 220 (S608).

It will be understood that the causing of electrical power to be supplied to the heater 220 at S608 causes the heater 220 to generate heat 222 that raises the temperature of the aerosol-forming substrate 201 (e.g., based on the heat 222 being transmitted at least to the first surface 203-1) to cause the aerosol-forming substrate 201 to generate an instance of aerosol 172 that may be entrained in (e.g., mixed with) air 170 drawn into the enclosure 210 to form aerosol 174 that may be drawn out of the enclosure 210 and out of the aerosol-generating device 100. Aerosol 172 that is generated by the aerosol-forming substrate 201 during a period where the heater 220 is continuously supplied with electrical power to generate heat 222 will be understood to be a single, discrete "instance" (also referred to herein as a "volume") of generated aerosol 172. When the supply of electrical power to the heater 220 is cut-off or reduced such that the heat 222 generated by the heater 220 is stopped or reduced and thus the aerosol-forming substrate 201 stops generating aerosol 172, and the electrical power to the heater 220 is later increased or re-started so that the aerosol-forming substrate 201 re-starts generating aerosol 172, the later-generated aerosol 172 will be understood to be a separate instance of aerosol 172 than the previously-generated instance of aerosol 172 that was generated prior to the cut-off or decrease of electrical power supply to the heater 220. It will further be understood that an instance of aerosol 174 is an instance of aerosol 172 mixed with at least a portion of the flow of air 170.

In some example embodiments, the activation of the heater 220 at S608 includes causing a particular supply of electrical power (e.g., a particular magnitude of electrical current) to be supplied from the power supply 142 to the heater 220 for a particular period of time following the determination S606=YES. In some example embodiments, the controller 144 may continue to cause electrical power to be supplied to the heater 220 for as long as the aforementioned internal conditions are determined to exist (S606=YES), and in some example embodiments the controller 144 may limit the supply of electrical power to be cut off after a particular period of time (e.g., 2 seconds) has elapsed since the aforementioned internal conditions were initially determined to exist (S606=YES), and the re-activation of the supply of electrical power to the heater 220 at S608 may be inhibited, even if S606=YES, until a particular amount of time has elapsed since the ending of the most recent supplying of electrical power to the heater 220, thereby establishing a minimum cool down period between separate generations of separate instances of aerosol 174.

In some example embodiments, the compression of the aerosol-forming substrate 201 by the compression assembly 230 at S604 is maintained before, during, and/or after the heater 220 being caused to generate heat at S608 to cause the aerosol-forming substrate 201 to generate aerosol 172.

Operations S610-S614, S620-S624, and S630-S632 may be implemented concurrently as shown in FIG. 6, sequentially, or any combination thereof. In some example embodiments, some or all of operations S610-S632 are not implemented at all.

At S610, a determination is made, e.g., at controller 144, regarding the magnitude of compression of the aerosol-forming substrate 201 by the compression assembly 230. Such a determination may be made based on receiving, e.g., at controller 144, force sensor signal(s) from a force sensor 340 in the heating chamber structure 200 and processing said signal to determine a magnitude of compression (e.g., compression value) indicated by the force sensor signal, where the magnitude of compression (e.g., in Newtons) indicates a magnitude of compression of the aerosol-forming substrate 201 by the compression assembly 230.

At S612, a determination is made, e.g., at controller 144, regarding whether the determined compression value at S610 matches a target compression value and/or is within a target range of compression values. Such determination may be performed based on accessing a stored target compression value or target range of compression values. If the determined compression value at S610 does match the target compression value and/or is within the target range of compression values (S612=YES), no active adjustment of the compression assembly 230 (e.g., through control of motor 332 operation by controller 144) is performed.

If the determined compression value at S610 does not match the target compression value and/or is not within the target range of compression values (S612=NO), the compression of the aerosol-forming substrate 201 is adjusted to approach and/or match the target compression value and/or be within the target range of compression values (S614). Such adjustment may be performed by controller 144 1) determining a difference between the determined compression value at S610 and the target compression value or a magnitude of the proximate boundary or center compression value of the target compression range, 2) determining an amount of operation and/or electrical power supply to motor 332 to cause said difference in compression value and 3) selectively causing said amount of operation and/or electrical power supply to the motor 332 to occur. Determining the amount of operation and/or electrical power supply to motor 332 to cause said difference in compression value may include accessing a look-up-table, generated through well-known empirical techniques, that associates magnitudes of compression value change with corresponding amounts of operation and/or electrical power supply to motor 332 to cause said magnitudes of compression value change to occur, and further identifying a particular amount of operation and/or electrical power supply to motor 332 that corresponds with the determined difference between the determined compression value at S610 and the target compression value or a magnitude of the proximate boundary or center compression value of the target compression value range. As shown, operations S610-S614 may be performed iteratively until the determined compression value does match the target compression value and/or is within the target range of compression values (S612=YES).

In some example embodiments, said stored target value or range of values used for the determination at S612 may be the same or different as target value(s) used to implement the compression of the aerosol-forming substrate 201 at S604. For example, an initial target compression value used to implement and/or control the compression at S604 may be smaller than a subsequent target compression value used to implement and/or control compression at S610-S614, such that the aerosol-forming substrate 201 is caused to be compressed more, after an initial generation of aerosol 172 subsequent to initial compression of the aerosol-forming substrate 201 at S604. In some example embodiments, the initial target compression value used to implement and/or control the compression at S604 may be greater than the subsequent target compression value used to implement and/or control compression at S610-S614.

At S620, a determination is made, e.g., at controller 144, regarding the magnitude of a determined temperature (e.g., a determined temperature value) during operation S608. The temperature value may be a temperature, e.g., a peak temperature, an average temperature, or the like, of some or all of heater 220, a temperature of some or all of the first surface 203-1, or a temperature of the aerosol-forming substrate 201 during the supplying of electrical power to the heater at S608. Such a determination may be made based on receiving, e.g., at controller 144, temperature sensor signal(s) from a temperature sensor 350 in the heating chamber structure 200 and/or heater 220. Such a determination may be made based on monitoring the supply of electrical power to the heater 220 at S608 and determining an electrical resistance value of the heating element 221 of the heater 220 during S608 and further determining a temperature value that corresponds to the determined resistance value. When the temperature value is determined based on correspondence with a determined resistance value, the determination may include accessing a look-up-table, which may be generated according to well-known empirical techniques, that associates heating element 221 resistance values with corresponding temperature values (where the temperature values may be temperatures of the heater 220, of first surfaces 203-1, and/or of the aerosol-forming substrate 201).

At S622, a determination is made, e.g., at controller 144, regarding whether the determined temperature value at S620 matches a target temperature value and/or within a target temperature value range. Such determination may be performed based on accessing a stored target temperature value or range of temperature values. If the determined temperature value at S620 does match the target temperature value and/or is within the target range of temperature values (S622=YES), no active adjustment of the supply of electrical power to the heater 220 (e.g., through control of electrical power supplied thereto by controller 144) is performed.

If the determined temperature value at S620 does not match the target temperature value and/or is not within the target range of temperature values (S622=NO), the controller 144 is configured to cause the heater 220 to be supplied a different (e.g., "adjusted") amount of electrical power during a future activation of the heater 220 at a future performance of S608, so that a future determined temperature value (at a future performance of S620) is caused to be adjusted to approach and/or match the target temperature value and/or be within the target temperature value range (S624). Such adjustment may be performed by controller 144 1) determining a difference between the determined temperature value at S620 and the target temperature value or a value of the boundary or center value of the target temperature value range, 2) determining a change in the amount of electrical power supplied to the heater 220 during S608 (e.g., a magnitude of the electrical current supplied from power supply 142 to heater 220) to cause said difference temperature value and 3) adjusting a stored value indicating the amount of electrical power to be caused to be supplied to the heater 220 during the future supplying (e.g., the next performance of S608) so that, at the next supplying at S608, the controller 144 will cause the amount of electrical power supplied from the power supply 142 to the heater 220 to be the new stored value, such that the determined temperature value at the next S620 should be closer to the target value or range of values. Determining the new amount of electrical power to be supplied at the next occurrence ("performance") of S608 may include accessing a look-up-table, generated through well-known empirical techniques, that associates magnitudes of temperature value change with corresponding changes in the amount of electrical power to supply to the heater 220 at the next performance of S608 to cause said temperature value changes, identifying the particular change in the amount of electrical power that corresponds to the determined temperature value difference, and applying the determined change in electrical power amount to the stored historical indication of the amount of electrical power to be supplied to the heater at the next performance of S608 to arrive at a new indication of the amount of electrical power to be supplied to the heater at the next performance of S608 and replacing the stored historical indication with the new indication. As shown, operations S620-S624 may be performed iteratively based on repeated occurrences of S608 until the determined compression does match the target compression magnitude and/or is within the target range of compression magnitudes (S622=YES).

At S630, a determination is made regarding whether aerosol-forming substrate 201 in the enclosure 210 is depleted, for example based on a determination that the aerosol-forming substrate 201 in the enclosure 210 has been depleted below a certain threshold.

In some example embodiments, such a determination may be made based on monitoring operation of a motor 332 of the compression actuator 232 over time (e.g., monitoring the change in position of a rotary element of the motor 332 and/or the actuator element 334 from an initial position over time) to determine an amount of linear movement 309A and/or 309B of the compression plate 234 through the enclosure 310 caused by the motor 332 from an initial, reference (e.g., start) position that corresponds to a particular magnitude of the volume of the first region 208-1. The dimensions of the enclosure 210 may be partially or entirely accessible to the controller 144, and/or the controller 144 may be configured to access a relationship between a change in volume of the first region 208-1 and a change in position of the compression plate 234. Accordingly, based on tracking the amount (e.g., magnitude) of linear movement 309A and/or 309B of the compression plate 234 (e.g., net and/or cumulative downward linear movement 309A from a particular start time, which may be a time at the most recent performance of S602, S604, and/or S608 occurs) through the enclosure 210 from an initial position that corresponds to an initial volume of the first region 208-1, and further applying said linear movement 309A and/or 309B to a corresponding reduction of the volume of the first region 208-1, the controller 144 may be configured to determine a present volume of the first region 208-1, and the aerosol-forming substrate 201 may be determined to be depleted in response to a determination that the volume of the first region 208-1 is less than a particular threshold volume 1.

In some example embodiments, such a determination at S630 may be made based on receiving and processing one or more signals from one or more position sensors 360 that indicate that the compression plate 234 is at one or more particular positions in the enclosure 210 in relation to said sensor(s) 360. For example, a given sensor 360 at a particular location in the enclosure 210 may generate a signal to the control system 140 in response to the compression plate 234 coming into contact with said sensor 360, where said signal indicates that the compression plate 234 is at said particular location in the enclosure 210, and the controller 144 is configured to determine a corresponding volume of the first region 208-1 based on receiving and processing a signal from one or more particular sensor(s) 360. For example, the controller 144 may receive one or more signals from one or more sensors 360 and may access a look-up table (generating through known empirical techniques) that associates particular signal(s) from particular sensor(s) 360 with corresponding volumes of the first region 208-1 and/or indications of whether the aerosol-forming substrate 201 is depleted. Accordingly, the controller 144 may determine whether the aerosol-forming substrate 201 is depleted based on receiving and processing signal(s) from the sensor(s) 360.

If a determination is made that aerosol-forming substrate 201 is not depleted (S630=NO), operation S630 may be performed repeatedly, for example at regular intervals after elapses of time, in response to each adjustment of compression at S614, in response to each separate instance of aerosol 172 being generated at S608, in response to any linear movement 309A and/or 309B of the compression plate 234, in response to interaction with any interface(s) 149, 160 of the aerosol-generating device 100, any combination thereof, or the like.

If a determination is made that aerosol-forming substrate 201 is depleted (S630=YES), operation S632 is performed. In some example embodiments, operation S632 may include causing the enclosure 210 to be opened, for example based on controller 144 causing hatch 290 and/or interfaces 402, 404 to be unlocked (e.g., based on transmitting a signal to one or more locking devices holding hatch 290 fixed to a remainder of the heating chamber structure 200 and/or to one or more locking devices holding interfaces 402, 404 fixed to each other) to enable the enclosure 210 to be opened and thus to enable reloading (e.g., manual reloading) of aerosol-forming substrate 201 in the enclosure 210 (S632). In some example embodiments, operation S632 may include the controller 144 selectively inhibiting or disabling further supplying of electrical power to the heater 220 (S608), even if signal(s) from sensor 146 and/or interface 149 are subsequently received (e.g., S606=YES), until a determination is made that aerosol-forming substrate 201 is no longer in a depleted state (e.g., the enclosure 210 has been re-loaded with sufficient amounts of aerosol-forming substrate 201). In some example embodiments, operation S632 may include selectively re-enabling the supply of electrical power to the heater 220 in response to a determination that enclosure 210 is closed (e.g., based on receiving a signal from a contact sensor of the heating chamber structure 200), a determination that the volume of the first region 208-1 is greater than a threshold value (e.g., based on determining the position of the compression plate 234 and/or processing signal(s) from one or more sensor(s) 360), any combination thereof, or the like. In some example embodiments, the aerosol-generating device 100 may be configured to enable the controller 144 to determine the position of the compression plate 234 in the enclosure 210, and thus the volume of the first region 208-1, through any well-known systems for enabling such determination, including one or more position sensors 360 included in the heating chamber structure 200 and/or compression assembly 230 that may generate signal(s) that may be processed by the controller 144 to determine a relative position of the compression plate 234 in the enclosure 210 (e.g., in relation to at least the first surface 203-1), to determine the volume of the first region 208-1 and compare the determined volume to a threshold volume value, and/or determine whether the aerosol-forming substrate 201 is depleted. Such determination may be implemented via accessing a look-up table that associates sensor 360 signal(s) and/or determined compression plate 234 positions with corresponding volume values of the first region 208-1 and/or indications of whether the aerosol-forming substrate 201 is depleted. In response to a determination that the aerosol-forming substrate 201 is not depleted, the controller 14 may, at S632, selectively enable heater 220 activation (S608) in response to at least some future signal(s) from sensor 146 and/or interface 149 are subsequently received (e.g., S606=YES).

In some example embodiments, operation S632 includes generating an indication, via an interface 160 of the aerosol-generating device 100, that indicates that aerosol-forming substrate 201 depleted, that further reloading of the aerosol-forming substrate 201 in the enclosure 210 should occur, and/or that further aerosol 172 generation is inhibited, even if S606=YES, until/unless such reloading occurs. In some example embodiments, the controller 144 is configured to "re-set" to re-enable aerosol 172 generation (e.g., enable heater 220 activation to enable S608 to be performed in response to S606=YES), for example in response to the hatch 290 being determined to be closed, in response to determining that a position of the compression plate 234 has changed to increase the volume of the first region 208-1 to be greater than the threshold volume value, in response to manual interaction with one or more interfaces 149, 160 of the aerosol-generating device, any combination thereof, or the like.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. An aerosol-generating device, comprising:
   a heating chamber structure defining an enclosure, the heating chamber structure configured to hold an aerosol-forming substrate within a first region of the enclosure, the heating chamber structure including a first surface at least partially defining the first region;
   a heater extending along a length of the first surface and coupled to the heating chamber structure, the heater configured to generate heat that is transmitted to the first surface to cause the aerosol-forming substrate in the enclosure to form an aerosol without any combustion of the aerosol-forming substrate; and
   a compression assembly at least partially within the enclosure, the compression assembly including a compression plate and a compression actuator coupled to the compression plate, the compression plate and the first surface defining opposing boundaries of the first region,
   wherein the compression actuator is configured to linearly move the compression plate through the enclosure and towards the first surface to reduce a volume of the first region.

2. The aerosol-generating device of claim 1, wherein the compression assembly is configured to adjustably compress the aerosol-forming substrate in the first region against the first surface based on maintaining a compression of the aerosol-forming substrate such that a substantially uniform packing density in the aerosol-forming substrate is maintained at one point in time across multiple aerosol formations.

3. The aerosol-generating device of claim 1, wherein the compression plate is permeable to gas flow such that the compression plate is configured to
   enable the aerosol to escape the first region through a thickness of the compression plate into a remainder, second region of the enclosure, and
   restrict the aerosol-forming substrate from escaping the first region into the remainder, second region of the enclosure.

4. The aerosol-generating device of claim 1, wherein the compression actuator comprises at least one of

- a spring configured to exert a spring force to push the compression plate towards the first surface, or
- a screw actuator configured to cause linear motion of the compression plate towards the first surface based on rotation of a nut in a screw shaft, or
- a plunger actuator configured to be manually manipulated to induce linear motion of the compression plate towards the first surface.

5. The aerosol-generating device of claim 1, wherein at least a portion of the heating chamber structure is at least partially detachable from a remainder of the heating chamber structure to enable direct exposure of at least a portion of the enclosure to an ambient environment that is external to the aerosol-generating device.

6. The aerosol-generating device of claim 5, wherein the portion of the heating chamber structure is a hatch that is at least partially detachable from the remainder of the heating chamber structure.

7. The aerosol-generating device of claim 1, wherein the compression actuator includes an actuator motor that is configured to operate, based on receiving electrical power, to induce motion of the compression plate.

8. The aerosol-generating device of claim 7, further comprising:
- a control system configured to control the actuator motor to adjustably control compression of the aerosol-forming substrate based on adjustably controlling the motion of the compression plate.

9. The aerosol-generating device of claim 8, further comprising:
- a force sensor configured to generate a force sensor signal based on compression of the aerosol-forming substrate in the first region by the compression assembly,
- wherein the control system is configured to control the actuator motor to control the compression of the aerosol-forming substrate based on processing the force sensor signal.

10. The aerosol-generating device of claim 1, further comprising:
- a control system configured to control a supply of electrical power to the heater to control heating of the aerosol-forming substrate.

11. The aerosol-generating device of claim 10, wherein the control system is configured to adjust the supply of electrical power to the heater based on determining a temperature value associated with the aerosol-forming substrate in the first region during heating by the heater, so that the determined temperature value approaches a target temperature value or target range of temperature values.

12. The aerosol-generating device of claim 1, further comprising:
- an outlet assembly defining an outlet conduit extending between an inlet and an outlet that is directly exposed to an exterior of the aerosol-generating device,
- wherein the outlet assembly is configured to direct the aerosol drawn from the enclosure of the heating chamber structure to the outlet via the outlet conduit,
- wherein the outlet assembly is configured to adjustably establish a ventilation flow conduit to direct an adjustable flow of ventilation air into the outlet conduit to mix with the aerosol drawn into the outlet conduit via the inlet of the outlet assembly.

13. The aerosol-generating device of claim 1, further comprising:
- a power supply configured to supply electrical power to the heater; and
- a controller configured to control the supply of electrical power from the power supply to the heater.

14. The aerosol-generating device of claim 13, further comprising:
- a first section that includes the heating chamber structure, the heater, and a first section connector interface; and
- a second section that includes the power supply, the controller, and a second section connector interface,
- wherein the first and second section connector interfaces are complementary with each other and are configured to detachably connect with each other to detachably connect the first and second sections together.

15. The aerosol-generating device of claim 1, wherein the aerosol-forming substrate is at least one of a plant material or a material that includes nicotine.

16. A method of operating the aerosol-generating device of claim 1, the method comprising:
- causing the compression actuator to move the compression plate through the enclosure and towards the first surface of the enclosure such that the volume of the first region of the enclosure is reduced to compress an aerosol-forming substrate within the first region against the first surface of the enclosure; and
- causing the heater to generate heat to cause the aerosol-forming substrate within the first region to form an aerosol without any combustion of the aerosol-forming substrate.

17. The method of claim 16, further comprising:
- adjusting a compression of the aerosol-forming substrate against the first surface of the enclosure by the compression assembly in response to processing force sensor signals received from a force sensor to determine a magnitude of the compression of the aerosol-forming substrate, and determining a difference between the determined magnitude of the compression and a target compression value or a target range of compression values, such that the compression of the aerosol-forming substrate is caused to be changed to reduce the difference between the determined magnitude of the compression and the target compression value or the target range of compression values.

18. The method of claim 16, further comprising:
- adjusting a temperature to which the aerosol-forming substrate is heated during the heating by the heater in response to determining a temperature value associated with the aerosol-forming substrate, and determining a difference between the determined temperature value and a target temperature value or a target range of temperature values, such that a supply of electrical power supplied to the heater to cause the heating is caused to be changed to reduce the difference between the determined temperature value and the target temperature value or the target range of temperature values.

* * * * *